(12) United States Patent
Shoemaker

(10) Patent No.: US 11,293,492 B2
(45) Date of Patent: Apr. 5, 2022

(54) BEARING MOUNT APPARATUS

(71) Applicant: LML Limited, Waterloo (CA)

(72) Inventor: Darryl Shoemaker, Waterloo (CA)

(73) Assignee: LML Limited, Waterloo (CA)

( * ) Notice: Subject to any disclaimer, the term of this patent is extended or adjusted under 35 U.S.C. 154(b) by 0 days.

(21) Appl. No.: 16/964,340

(22) PCT Filed: Jan. 30, 2019

(86) PCT No.: PCT/CA2019/050111
§ 371 (c)(1),
(2) Date: Jul. 23, 2020

(87) PCT Pub. No.: WO2019/148273
PCT Pub. Date: Aug. 8, 2019

(65) Prior Publication Data
US 2021/0048070 A1    Feb. 18, 2021

Related U.S. Application Data

(60) Provisional application No. 62/623,668, filed on Jan. 30, 2018.

(51) Int. Cl.
*F16C 35/04*    (2006.01)
*F16C 35/067*    (2006.01)

(52) U.S. Cl.
CPC ............ *F16C 35/042* (2013.01); *F16C 35/04* (2013.01); *F16C 35/067* (2013.01)

(58) Field of Classification Search
CPC ...... F16C 35/04; F16C 35/042; F16C 35/045; F16C 35/047; F16C 35/06; F16C 35/067
See application file for complete search history.

(56) References Cited

U.S. PATENT DOCUMENTS 748,825 A    1/1904   Webb
1,781,467 A  * 11/1930  Madsen ................ F16C 35/067
                                                    384/534
(Continued)

FOREIGN PATENT DOCUMENTS

AU    2009201918 A1    12/2009
CA    2308546 A1        4/1999
(Continued)

OTHER PUBLICATIONS

International Search Report and Written Opinion dated Mar. 26, 2019 in corresponding International Patent Application PCT/CA2019/050111 (7 pages).

*Primary Examiner* — James Pilkington
(74) *Attorney, Agent, or Firm* — Bereskin & Parr LLP/S.E.N.C.R. L., s.r.l.; Tony Orsi

(57) ABSTRACT

Various bearing mount apparatuses for housing and removably retaining a bearing and a mounting adaptor both in fixed location relative to a structure are described. The bearing mount apparatus comprises a split bearing housing that has a first housing section and a second housing section removably couplable to the first housing section, the bearing being removably received within the bearing housing when the second housing section is coupled to the first housing section. The mounting adaptor comprises a first adaptor end and a second adaptor end, the first adaptor end being configured to couple the mounting adaptor to the structure and the second adaptor end being removably received within the bearing housing for coupling the mounting adaptor to the bearing housing when the second housing section is coupled to the first housing section.

35 Claims, 16 Drawing Sheets

(56) References Cited

U.S. PATENT DOCUMENTS

| | | | |
|---|---|---|---|
| 3,383,142 A | | 5/1968 | Scott |
| 3,936,099 A | * | 2/1976 | Braun .................. F16C 23/084 384/537 |
| 3,954,311 A | | 5/1976 | Pike |
| 5,833,372 A | | 11/1998 | Nisley |

FOREIGN PATENT DOCUMENTS

| | | | |
|---|---|---|---|
| DE | 2809438 A1 | | 9/1979 |
| DE | 102016212642 | * | 1/2018 |
| EP | 0442100 A1 | | 8/1991 |
| EP | 2409046 B1 | | 9/2017 |
| GB | 2169360 A | | 10/1988 |

* cited by examiner

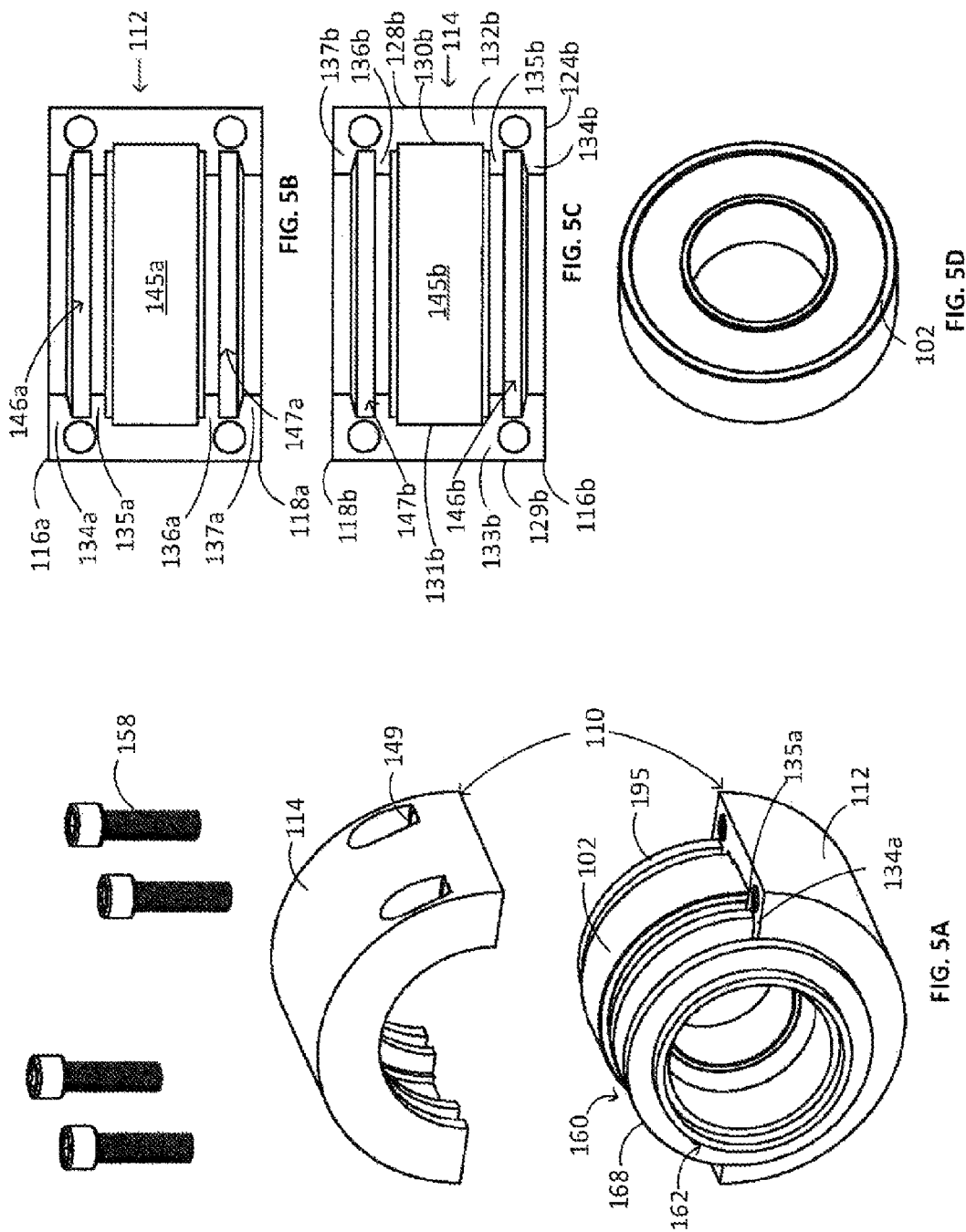

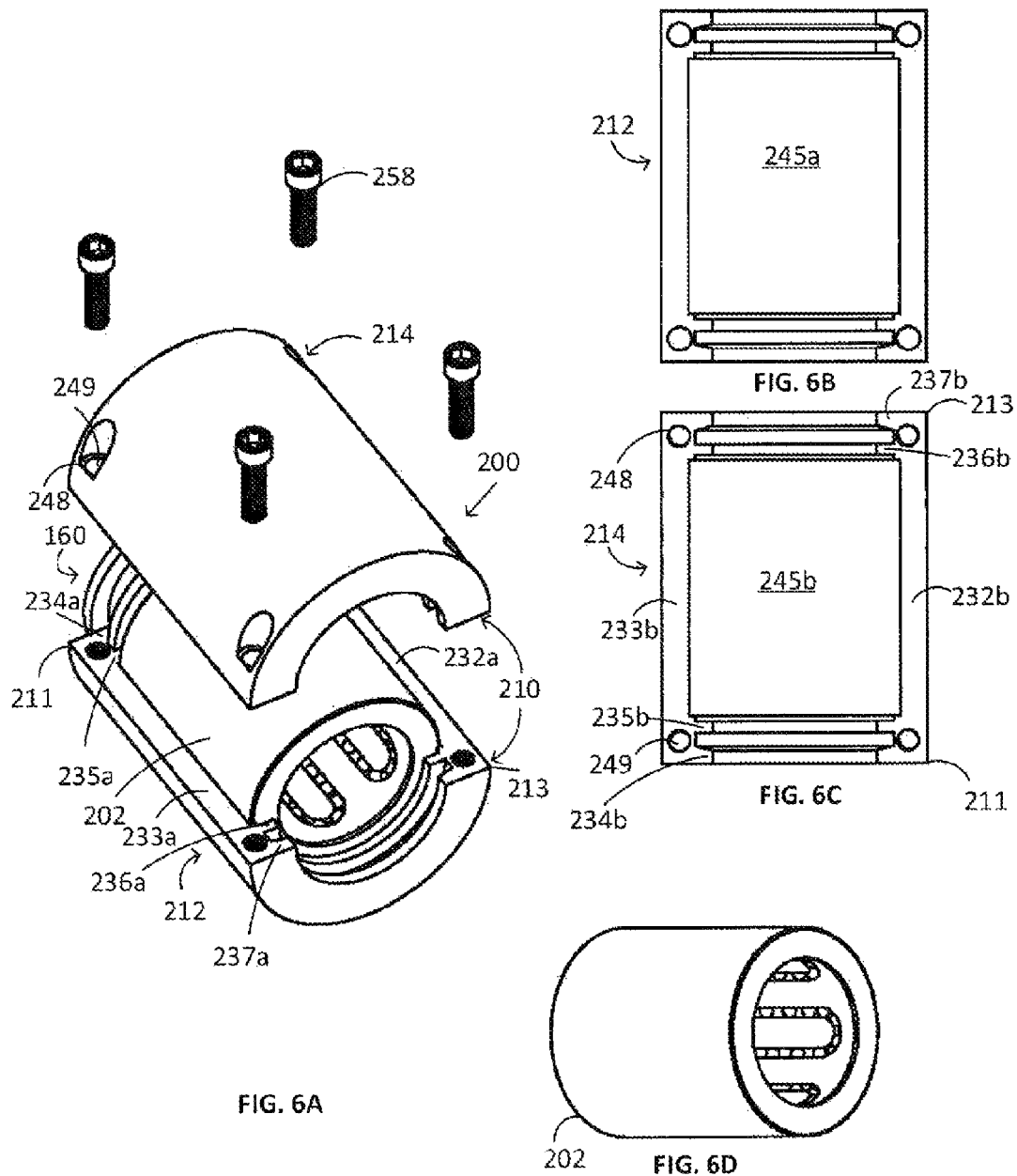

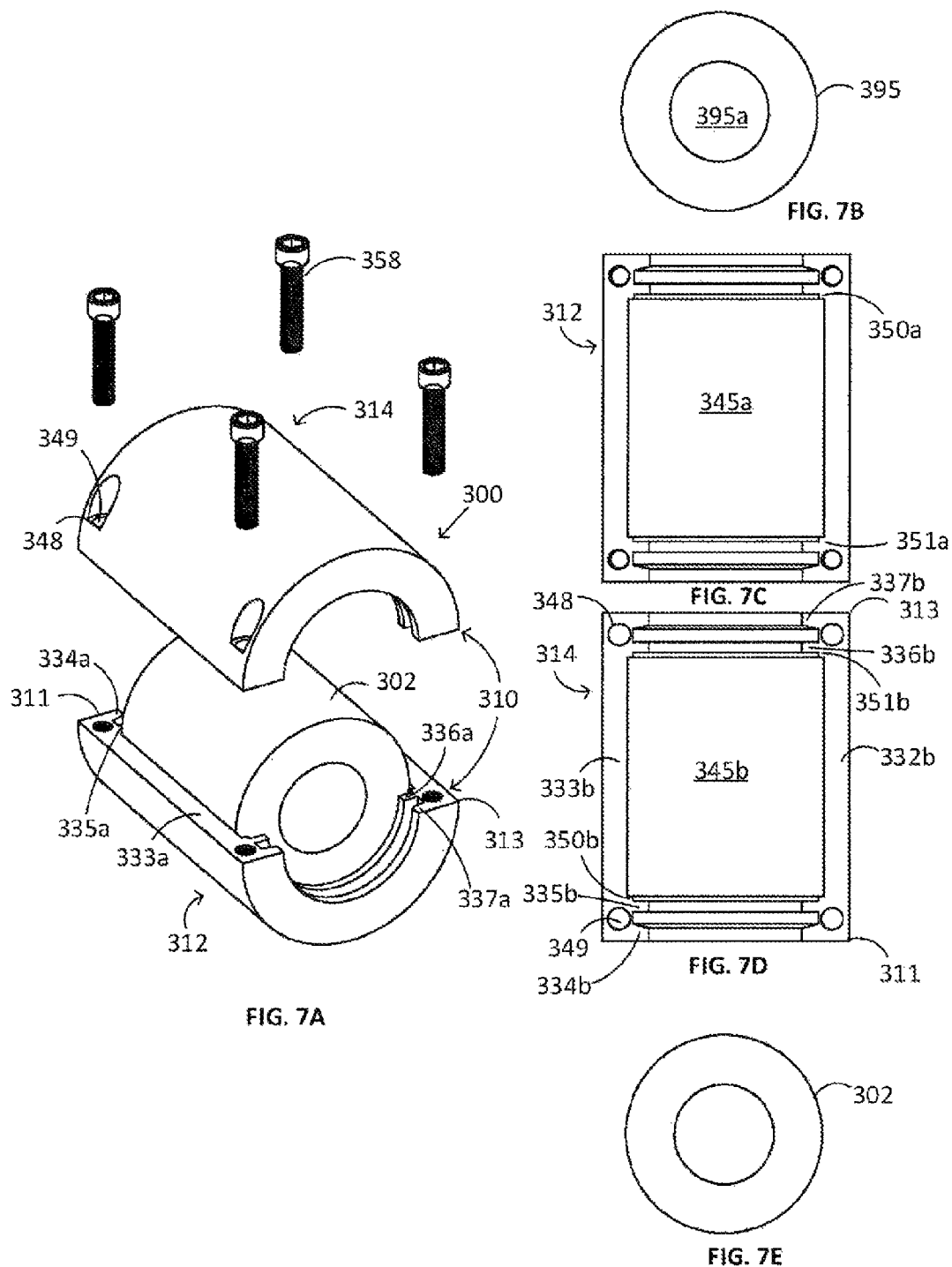

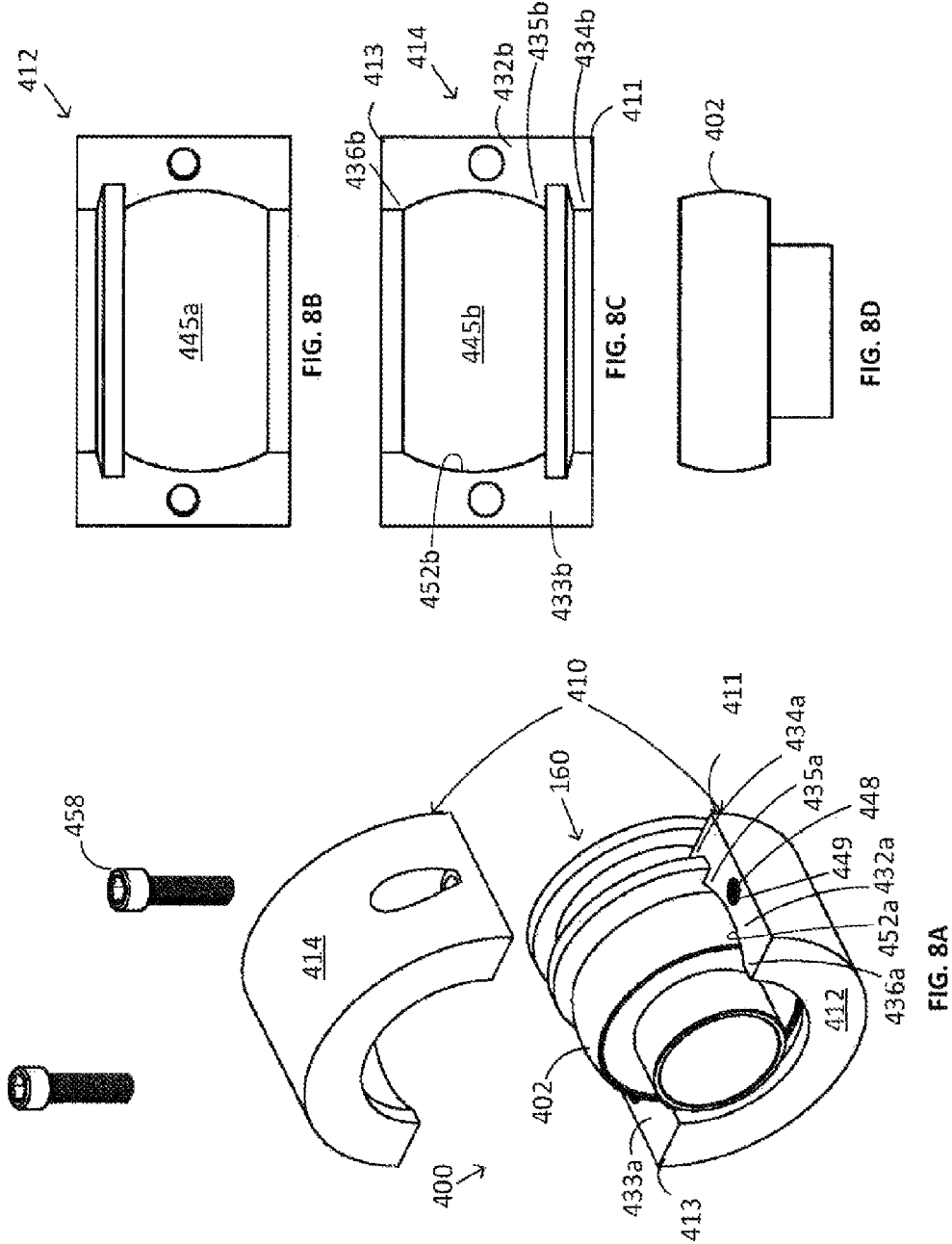

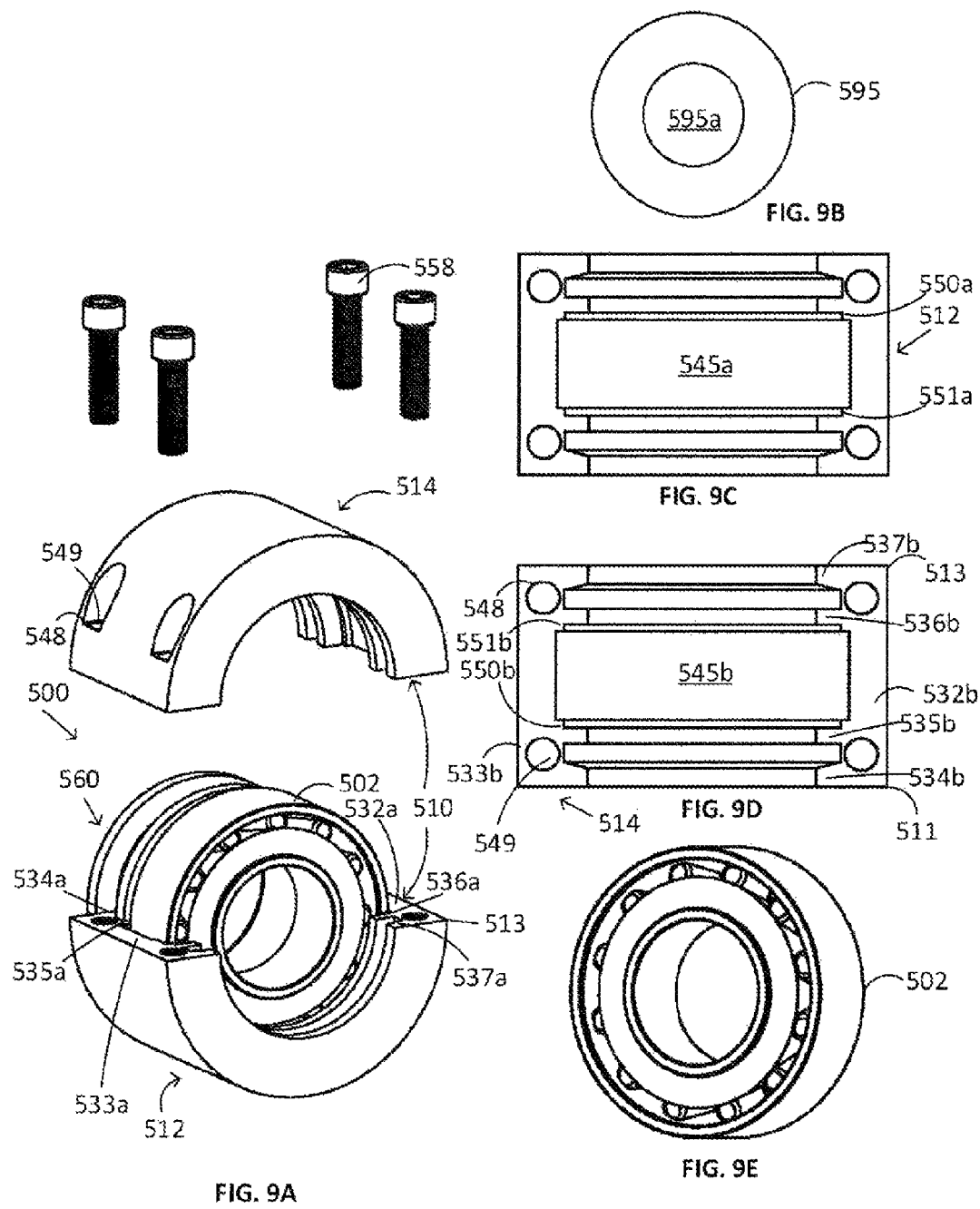

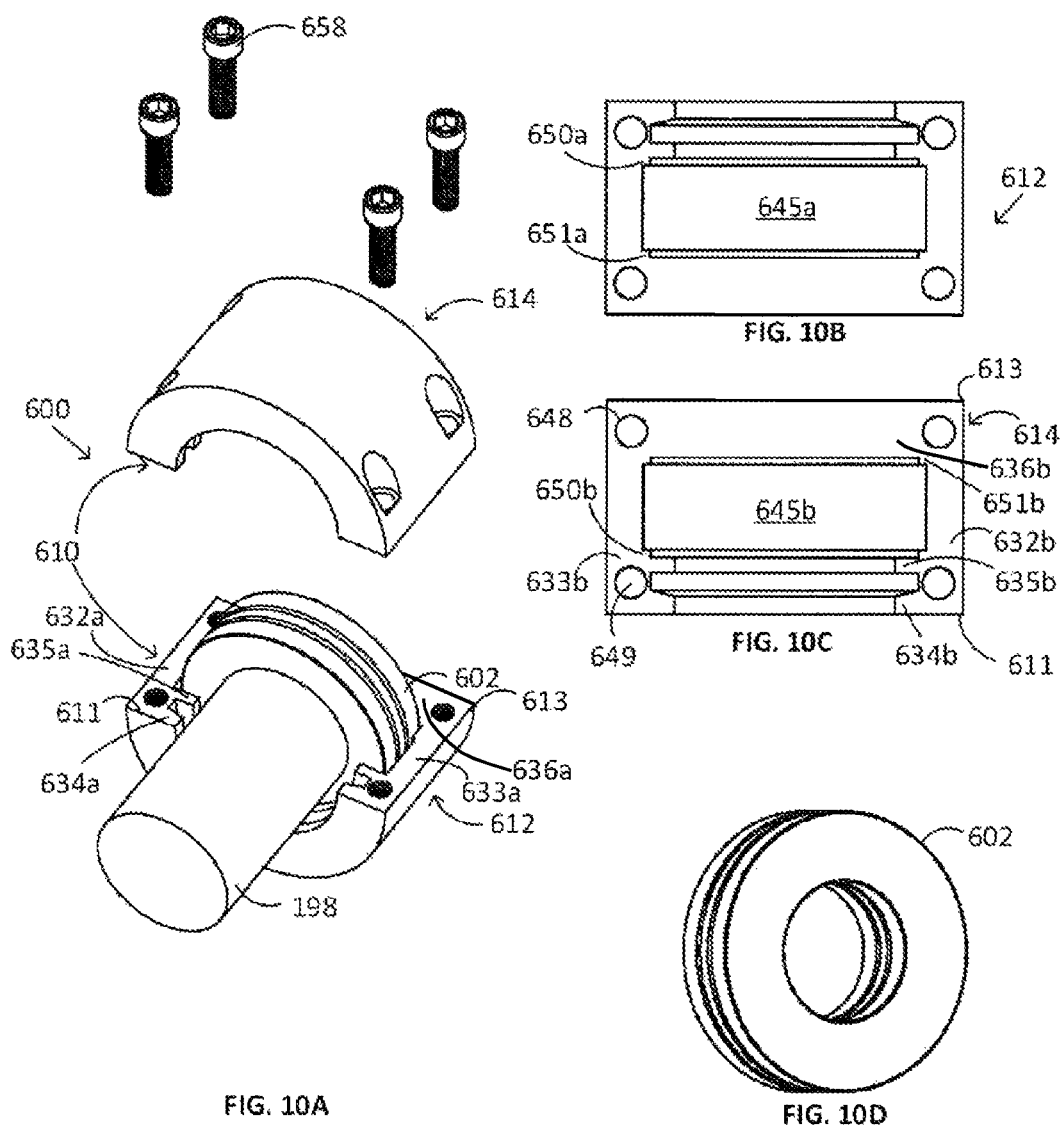

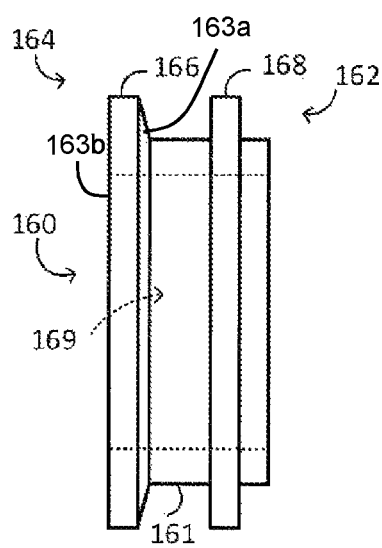
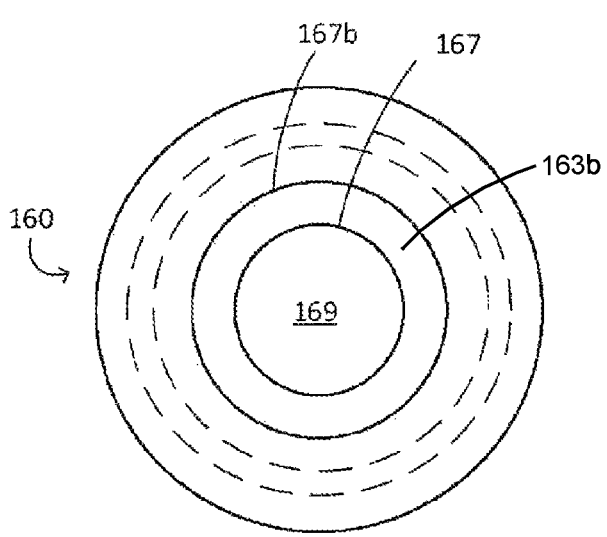
FIG. 11A                FIG. 11B
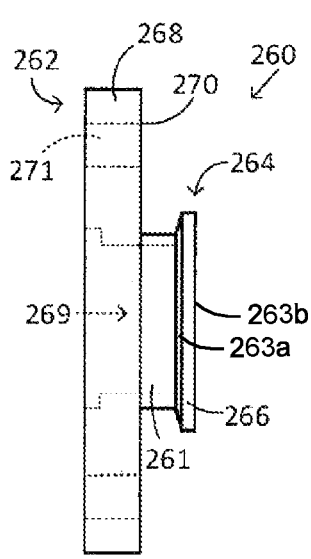
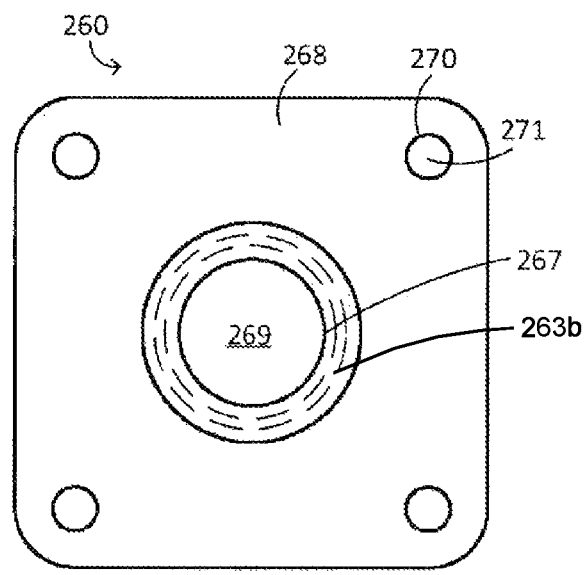
FIG. 12A                FIG. 12B

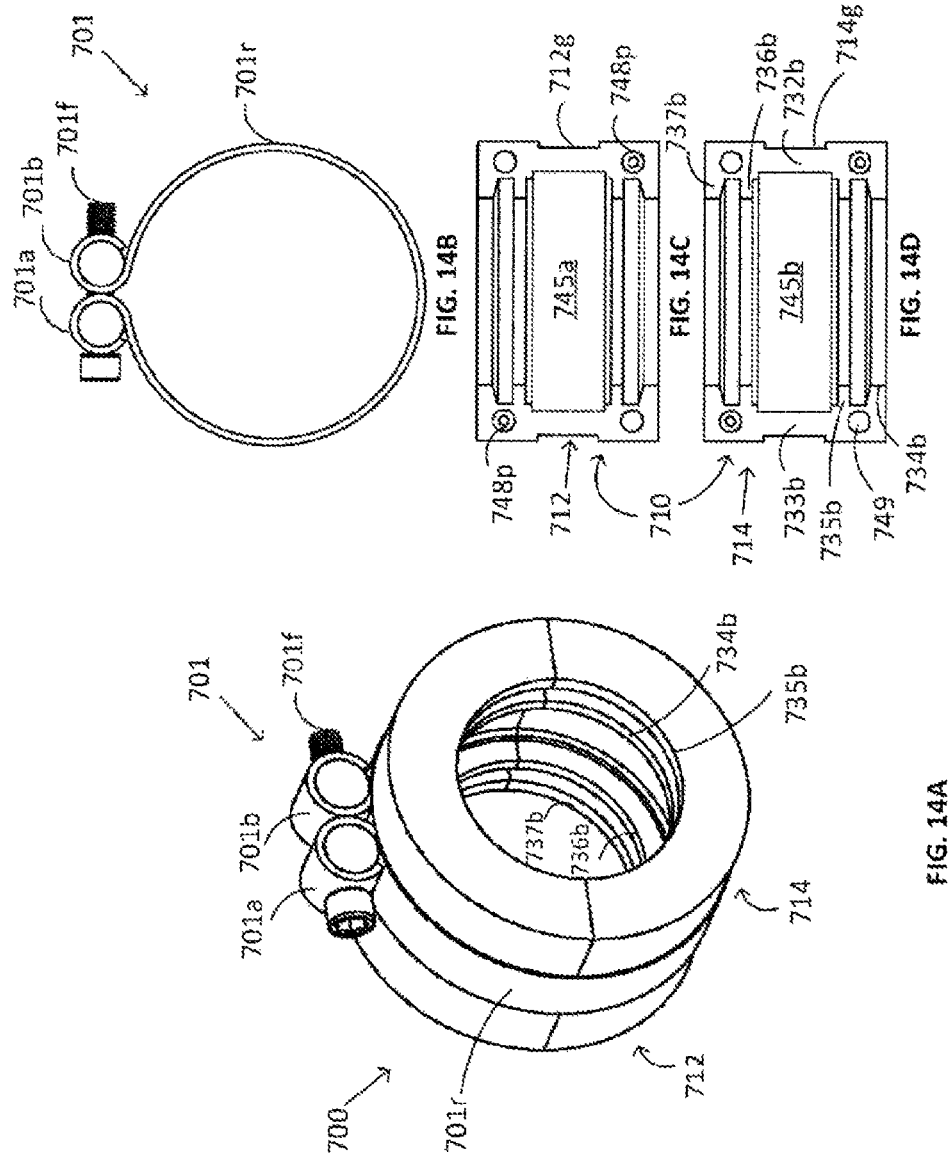

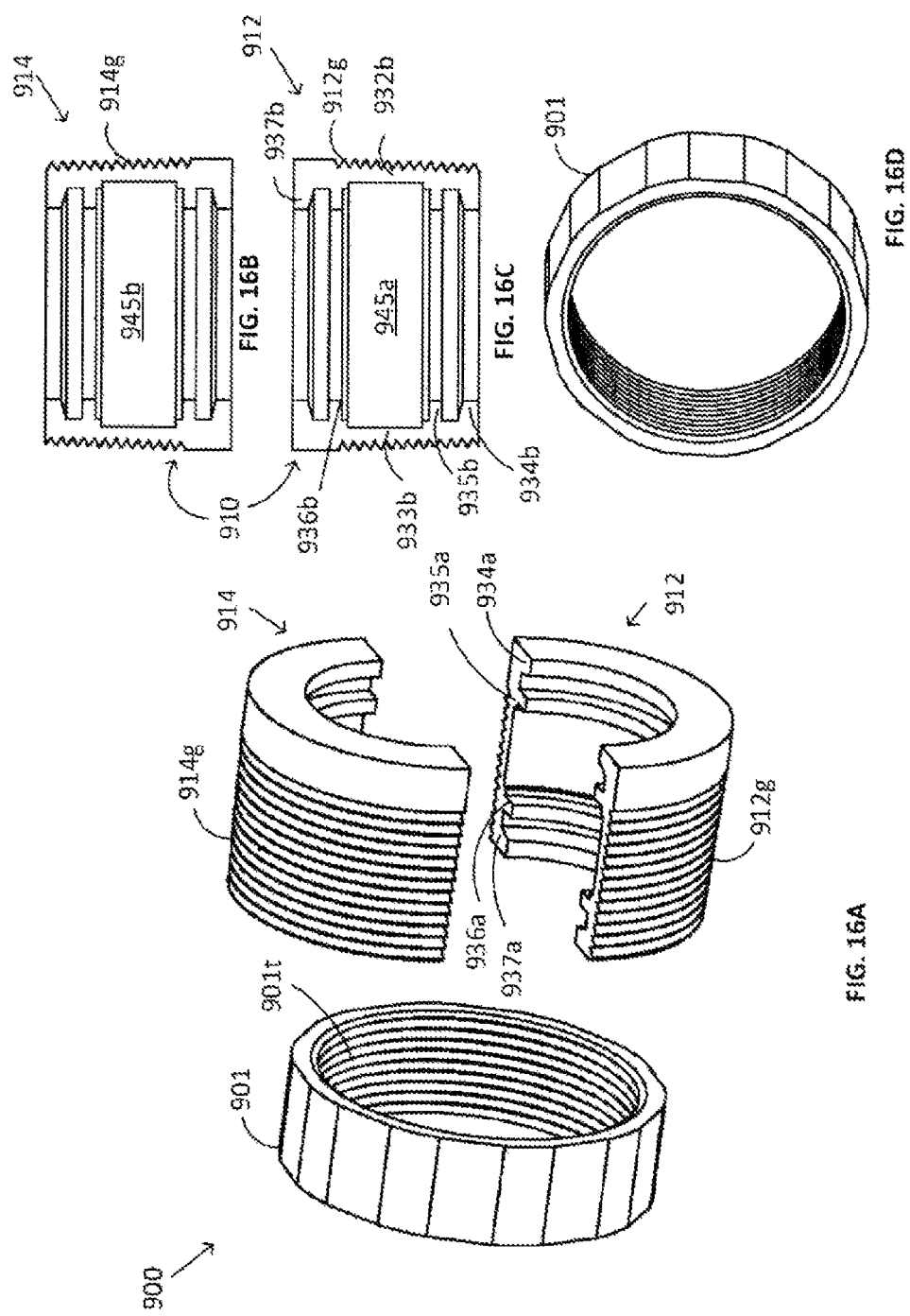

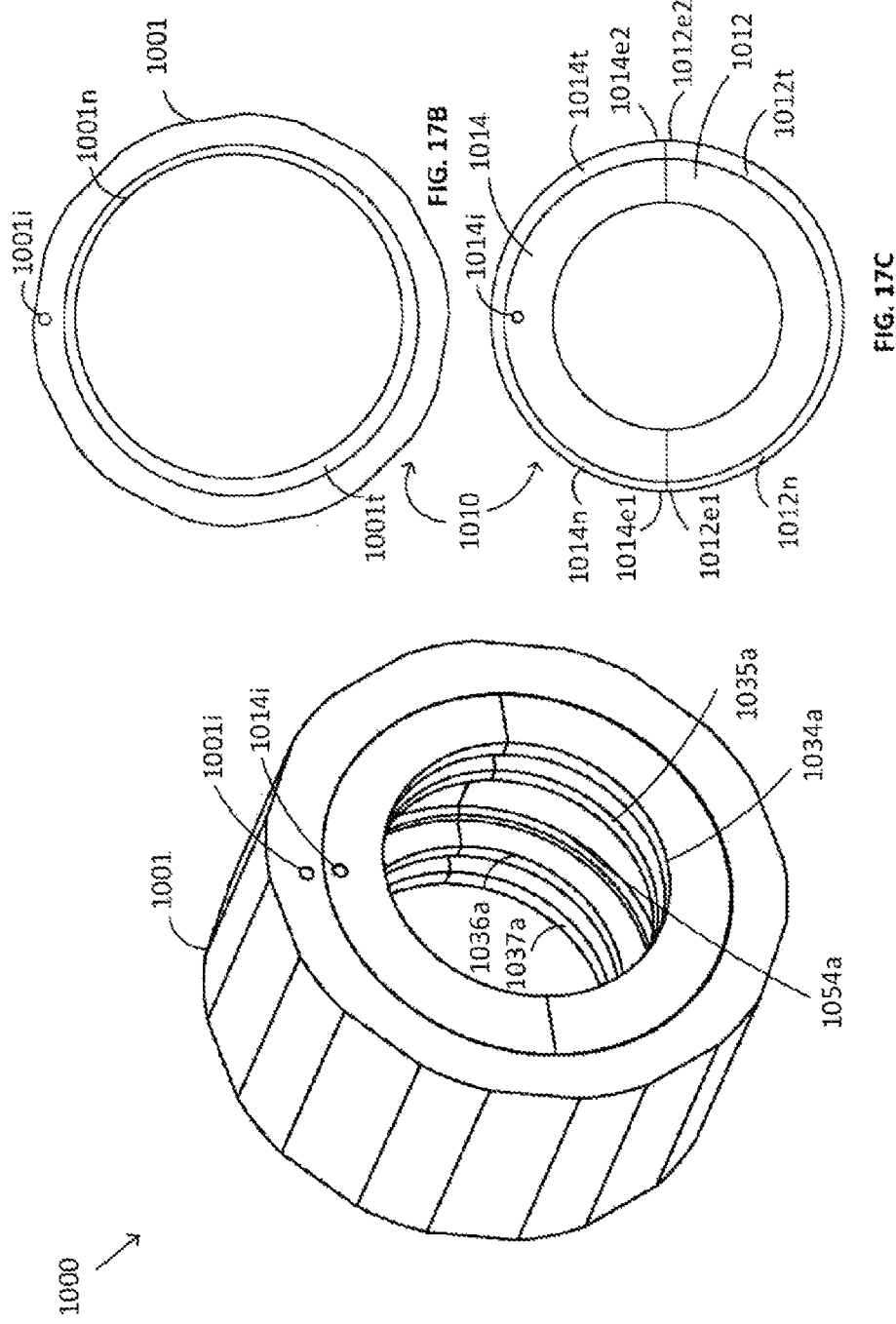

BEARING MOUNT APPARATUS

CROSS-REFERENCE TO RELATED APPLICATION

This application is a 35 USC 371 national stage entry of International Patent Application No. PCT/CA2019/050111, filed Jan. 30, 2019, which claims the benefit of U.S. Provisional Patent Application No. 62/623,668, filed Jan. 30, 2018, and entitled "BEARING MOUNT APPARATUS"; the entire contents of each of which are hereby incorporated by reference.

FIELD

This disclosure generally relates to a bearing mount apparatus for removably receiving a bearing and a mounting adaptor.

BACKGROUND

Conventional bearing housings are generally used to receive a bearing, retain the bearing at a fixed location relative to a machine or a structure, and/or protect the bearing from the outside environment. Some conventional bearing housings may comprise a single, unitary housing piece that may receive the bearing through, e.g., an interference fit, in which case, the bearing may not be easily accessible. For example, if one side of the housing is closed, the side of the bearing adjacent to the closed side of the housing may not be easily accessed for maintenance, lubrication, etc. without removing the bearing from the housing. Additionally, or alternatively, if the bearing is required to be removed and/or replaced, a relatively large amount of force may be needed to remove the bearing from the unitary housing that received the bearing through, e.g., the interference fit. If the housing is permanently attached to the machine through, e.g., welding, the replacement may need to take place on site. This may mean that the force exerted for removing the bearing may be transferred to the machine or structure that the housing is attached to. This may have detrimental effects on the machine or the structure.

Moreover, in most of the known conventional bearing housings, the housing is mounted to a machine or a structure through a flange that is integrally formed with the housing. The integral flange may include a number of through bores for receiving fasteners for mounting the housing to the machine or structure. Accordingly, the bearing housing may only be mounted to some specific structures or machines, or to structures or machines that can accommodate the specific shape of the bearing housing and/or its flange. That is, due to the specific shape of the housing and/or positioning of integral mounting flanges not every machine or structure may be able to receive the bearing housing. Alternatively, or in addition, this limitation may mean that the structure or machine may need to be modified for the bearing housing to be properly mounted to the structure or machine.

SUMMARY

This disclosure generally relates to a split type bearing mount apparatus for removably receiving both a bearing insert and a mounting adaptor and in some cases also removably receiving a sealing cap. The split bearing housing can maintain the bearing in a fixed location relative to a structure when the mounting adaptor is coupled to the structure. The following summary is intended to introduce the reader to various aspects of the applicant's teaching, but not to delimit any claimed subject matter.

In one aspect, at least one embodiment is provided herein for a bearing mount apparatus for housing and retaining a bearing in a fixed location relative to a structure, the bearing mount apparatus comprising a split bearing housing comprising a first housing section and a second housing section removably couplable to the first housing section, the bearing being removably received within the split bearing housing when the second housing section is coupled to the first housing section; and a mounting adaptor comprising a first adaptor end and a second adaptor end, the first adaptor end being configured to couple the mounting adaptor to the structure and the second adaptor end being removably received within the split bearing housing for coupling the mounting adaptor to the split bearing housing and retaining the bearing in the fixed location relative to the structure when the second housing section is coupled to the first housing section.

In at least one embodiment, each of the first and the second housing sections comprises a first housing section end and a second housing section end spaced longitudinally away from the first housing section end.

In at least one embodiment, each of the first and the second housing sections have first inner wall portions that are structured to removably receive a portion of the bearing in a position longitudinally intermediate the first housing section end and the second housing section end.

In at least one embodiment, each of the first and the second housing sections have second inner wall portions that are structured to removably receive a portion of the second adaptor end in a position disposed towards the first housing section end.

In at least one embodiment, the first and the second housing sections comprise inner walls having a plurality of longitudinally spaced apart ribs and a plurality of grooves where at least one groove is defined between two successive ribs of the plurality of ribs.

In at least one embodiment, the plurality of grooves comprises a bearing groove that is configured to receive a portion of the bearing, and a mounting adaptor groove that is configured to receive a portion of the second adaptor end.

In at least one embodiment, the mounting adaptor groove is defined in a first space bounded by a first rib positioned towards the first housing section end, the inner wall of the split bearing housing and by a second rib that is positioned intermediate the first housing section end and the second housing section end.

In at least one embodiment, the bearing groove is defined in a second space bounded by the second rib, the inner wall of the split bearing housing and a third rib that is positioned longitudinally away from both the first housing section end and the second rib.

In at least one embodiment, the plurality of ribs are arcuate and project radially inwardly.

In at least one embodiment, the plurality of grooves are arcuate.

In at least one embodiment, the plurality of ribs and the plurality of grooves are semi-annular.

In at least one embodiment, the first adaptor end comprises a housing flange having a flange thickness and a flange diameter and for each of the first and the second housing sections: a width of the mounting adaptor groove is equal to or greater than the flange thickness; a radius of the mounting adaptor groove is equal to or greater than one half of the flange diameter; and the bearing groove is configured to receive the bearing through an interference fit.

In at least one embodiment, outer walls of the first and the second housing sections are curved about a longitudinal axis and define a semicircle on a plane generally orthogonal to the longitudinal axis intersecting the outer wall, each of the first and second housing sections have a hollowed semi-cylinder shape, and when the second housing section is coupled to the first housing section the split bearing housing has a hollowed cylinder shape.

In at least one embodiment, for each of the first and the second housing sections: the second housing section end is at least partially open; and the plurality of ribs further comprises a fourth rib being positioned longitudinally away from the first rib, the second rib and the third rib towards the second housing section end; wherein, when the second housing section is coupled to the first housing section, the at least partially open second housing section end has a generally circular opening.

In at least one embodiment, a semi-annular sealing groove is defined by the third rib, the inner wall of the respective housing section and the fourth rib, the semi-annular sealing groove being configured to removably receive a portion of a sealing cap for sealing for closing the second housing section end.

In at least one embodiment, for each of the first and the second housing sections, the second housing section end is closed.

In at least one embodiment, the first and the second housing sections are identical.

In at least one embodiment, each of the first and the second housing sections comprise at least one inner perimeter that at least partially defines and bounds at least one bore that is configured to receive at least one fastener for removably coupling the second housing section to the first housing section.

In at least one embodiment, the bearing mount apparatus further comprises a clamp band having a ring, coupling members and a fastener, the ring of the clamp band being disposed along outer surfaces of the first and second housing sections and the coupling members being coupled to one another by the fastener to secure the first and second housing sections together.

In such embodiments, the first and second housing sections may comprise grooves on the outer surfaces thereof that are sized to receive the ring.

In at least one embodiment, the first and the second housing sections comprise tapered longitudinal edges with at least one inner perimeter that at least partially defines and bounds at least one bore that is configured to receive at least one fastener for removably coupling the second housing section to the first housing section.

In at least one embodiment, the bearing mount apparatus further comprises a tapered threaded collar with threads on an internal surface thereof, the first and second housing sections comprise corresponding grooves on an outer surface thereof, the tapered threaded collar is sized to removably receive the first and second housing sections and the tapered threaded collar is screwed onto the first and second housing sections to secure the first and second housing sections together.

In at least one embodiment, the bearing mount apparatus further comprises an eccentric locking collar with an eccentric internal diameter, the first and second housing sections comprise an outer layer with a varying thickness to provide the housing with an eccentric outer diameter, and the eccentric locking collar is sized to removably receive the first and second housing sections and be rotated relative to the first and second housing sections to secure the first and second housing sections together.

In at least one embodiment, the bearing mount apparatus further comprises the bearing, the bearing being a spherical ball bearing, a cylindrical ball bearing, a thrust bearing, a linear bearing, a tapered roller bearing, or a plain bearing.

In at least one embodiment, the first adaptor end comprises a mounting flange.

In at least one embodiment, the mounting adaptor comprises a main body intermediate the first adaptor end and the second adaptor end, the first adaptor end and the second adaptor end being at least partially open, the mounting flange being coupled to the main body towards the first adaptor end, the housing flange being coupled to the main body towards the second adaptor end, the main body having an inner perimeter defining an aperture in fluid communication with the at least partially open first and second adaptor ends, the aperture being configured to allow a shaft to pass through the mounting adaptor.

In at least one embodiment, the mounting flange is configured to be welded to the structure.

In at least one embodiment, the mounting flange is configured to be removably coupled to the structure.

In at least one embodiment, the mounting flange comprises a plurality of inner perimeters at least partially defining and bounding a plurality of bores that are configured to receive fasteners to removably couple the mounting flange to the structure.

In at least one embodiment, at least one of the first and second housing sections comprise two or more subsections.

In at least one embodiment, the split bearing housing comprises a third housing section that is removably couplable to the first and second housing sections, and the bearing and second adaptor end of the mounting adaptor are removably received within the split bearing housing when the first, second and third housing sections are coupled to one another.

In at least one embodiment, the bearing mount apparatus further comprises a lubrication groove adjacent the bearing and a through porting that connects the lubrication groove to an exterior surface of the split bearing housing for receiving lubrication.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 1 is a perspective view of an example embodiment of a bearing mount assembly which includes a split bearing housing and a mounting adaptor, the bearing mount assembly coupled to a structure and the bearing mount assembly having a shaft passing there through.

FIG. 5A is a partially exploded perspective view of the bearing mount assembly of FIG. 1 also showing the ball bearing and the sealing cap.

FIGS. 5B-5C are inside views of the first and second housing sections, respectively, of the split bearing housing of FIG. 5A.

FIG. 5D is a perspective view of the ball bearing of FIG. 5A.

FIG. 6A is a partially exploded perspective view of another example embodiment of a bearing mount assembly with a linear bearing insert.

FIGS. 6B-6C are inside views of the first and second housing sections, respectively, of the split bearing housing of FIG. 6A.

FIG. 6D is a perspective view of the linear bearing insert of FIG. 6A.

FIG. 7A is a partially exploded perspective view of another example embodiment of a bearing mount assembly without a mounting adaptor and with a plain bearing insert.

FIG. 7B is a top view of a sealing cap.

FIGS. 7C-7D are inside views of the first and second housing sections, respectively, of the split bearing housing of FIG. 7A.

FIG. 7E is a perspective view of the plain bearing insert of FIG. 7A.

FIG. 8A is a partially exploded perspective view of another example embodiment of a bearing mount assembly also showing a spherical ball bearing.

FIGS. 8B and 8C are inside views of the first and second housing sections, respectively, of the split bearing housing of FIG. 8A.

FIG. 8D is a side view of the spherical ball bearing of FIG. 8A.

FIG. 9A is a partially exploded perspective view of another example embodiment of a bearing mount assembly also showing a tapered roller bearing.

FIG. 9B is a top view of a sealing cap.

FIGS. 9C-9D are inside views of the first and second housing sections, respectively, of the split bearing housing of FIG. 9A.

FIG. 9E is a perspective view of the tapered roller bearing of FIG. 9A.

FIG. 10A is a partially exploded perspective view of another example embodiment of a bearing mount assembly without a mounting adaptor but showing a thrust bearing insert and a shaft.

FIGS. 10B-10C are inside views of the first and second housing sections, respectively, of the split bearing housing of FIG. 10A.

FIG. 10D is a perspective view of the thrust bearing insert of FIG. 10A.

FIG. 11A is a side view of an example mounting adaptor.

FIG. 11B is a top view of the mounting adaptor of FIG. 11A.

FIG. 12A is a side view of another example mounting adaptor.

FIG. 12B is a top view of the mounting adaptor of FIG. 12A.

FIG. 14A is a perspective view of an alternative example embodiment of a bearing mount assembly without a mounting adaptor in which a clamp band is used to secure the housing sections together (the bearing insert is not shown).

FIG. 14B shows a side view of the clamp band of FIG. 14A.

FIGS. 14C-14D are insides view of the first and second housing sections, respectively, of the split bearing housing of FIG. 14A.

FIG. 16A is an exploded perspective view of another example embodiment of a bearing mount assembly without a mounting adaptor showing two housing sections of a split bearing housing that are securable to one another using a tapered threaded collar.

FIGS. 16B-16C are inside views of the first and second housing sections, respectively, of the split bearing housing of FIG. 16A.

FIG. 16D is a perspective view of the tapered threaded collar of FIG. 16A.

FIG. 17A is a perspective view of another alternative embodiment of a bearing mount assembly shown without a mounting adaptor in which an eccentric locking collar is used to secure the housing sections together.

FIG. 17B is a view of the eccentric locking collar of FIG. 17A.

FIG. 17C is a view of the housing section of the bearing mount assembly of FIG. 17A.

Figure 1:
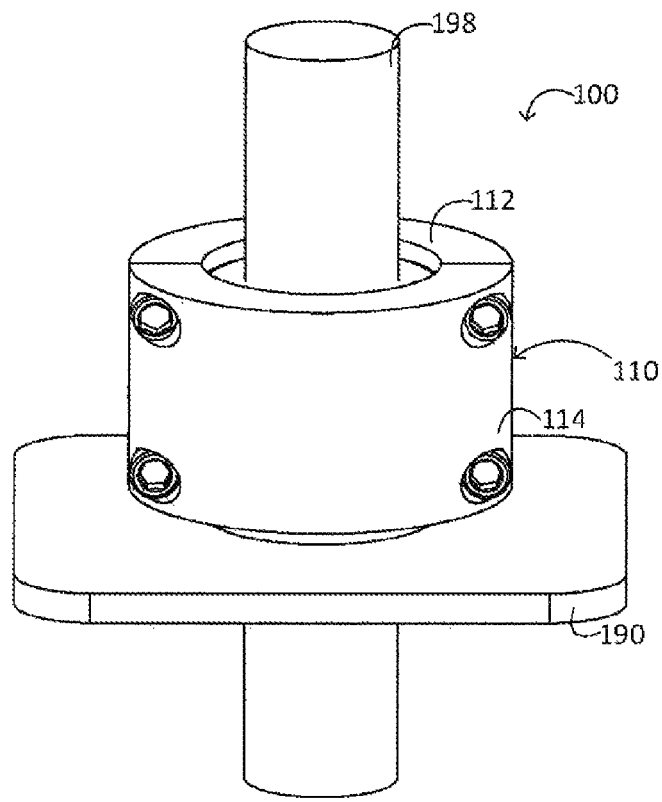

The skilled person in the art will understand that the drawings, further described below, are for illustration purposes only. The drawings are not intended to limit the scope of the applicant's teachings in any way. Also, it will be appreciated that for simplicity and clarity of illustration, elements shown in the figures have not necessarily been drawn to scale. For example, the dimensions of some of the elements may be exaggerated relative to other elements for clarity. Further aspects and features of the example embodi-

DESCRIPTION OF VARIOUS EMBODIMENTS

Various embodiments in accordance with the teachings herein will be described below to provide an example of at least one embodiment of the claimed subject matter. No embodiment described herein limits any claimed subject matter. The claimed subject matter is not limited to apparatuses or methods having all of the features of any one of the apparatuses or methods described below or to features common to multiple or all of the apparatuses or methods described herein. It is possible that there may be an apparatus or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending on the context in which these terms are used. For example, the terms coupled or coupling can have a mechanical connotation and indicate that two elements or devices can be directly connected to one another or connected to one another through one or more intermediate elements, depending on the particular context.

It should also be noted that, as used herein, the wording "and/or" is intended to represent an inclusive-or. That is, the text "X and/or Y" is intended to mean X or Y or both, for example. As a further example, the text "X, Y, and/or Z" is intended to mean X or Y or Z or any combination thereof.

It should be noted that terms of degree such as "substantially", "similarly", "about" and "approximately" as used herein mean a reasonable amount of deviation of the modified term such that the end result is not significantly changed. These terms of degree may also be construed as including a deviation of the modified term, such as 1%, 2%, 5%, or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as up to 1%, 2%, 5% or 10%, for example.

Referring now to FIGS. 1-5D, shown therein is an example embodiment of a bearing mount assembly 100 (which may also be referred to as bearing mount apparatus) that generally comprises a split bearing housing 110 and a mounting adaptor 160, although the bearing mount apparatus 100 can comprise any other mounting adaptor disclosed herein, e.g. mounting adaptors 260, 360. The bearing housing 110 is configured to house a bearing, e.g., ball bearing 102, and removably receive the mounting adaptor 160. The mounting adaptor 160 is configured to be removably received within the bearing housing 110 and to couple the bearing housing 110 to a structure or a machine, e.g., structure 190. Accordingly, when the bearing is housed within the bearing housing 110 and the bearing housing 110 is coupled to the structure 190 through the mounting adaptor 160, the bearing can be retained at a fixed location relative to the structure 190. It should be understood that the term "bearing" as used in this document is meant to be the same as the term "bearing insert".

Referring still to FIGS. 1-5D, the split bearing housing 110 generally comprises a first housing end 111 and a second housing end 113 spaced longitudinally away from the first housing end 111 along a longitudinal axis 101. The first housing end 111 is at least partially open and configured to receive a portion of the mounting adaptor 160. A region intermediate to the first housing end 111 and the second housing end 113, as described herein, is configured to receive the bearing, e.g., bearing 102. In some embodiments, for example, as shown in FIGS. 3A, 3B, and 5A-5D, the second housing end 113 can be at least partially open and can be configured to receive a sealing cap 195 to seal the interior of the housing 110, i.e. where the bearing 102 is received, from the outside environment. In some other embodiments, the second housing end 113 can be completely closed.

The split bearing housing 110 comprises a first housing section 112 and a second housing section 114 that are removably couplable to each other. The split bearing housing 110 is formed when the first housing section 112 and the second housing section 114 are coupled together. Each of the first housing section 112 and the second housing section 114 includes a first housing section end 116a, 116b, respectively, and second housing section end 118a, 118b, respectively, spaced longitudinally away from the first housing section end 116a, 116b along the longitudinal axis 101. The first housing section end 116a, 116b generally coincides with the first housing end 111 and the second housing section end 118a, 118b generally coincides with the second housing end 113. In other embodiments, this may not be the case.

When the first housing section 112 is coupled to the second housing section 114, the first housing section end 116a of the first housing section 112 and the first housing section end 116b of the second housing section 114 cooperate to form the first housing end 111. Similarly, the second housing section end 118a of the first housing section 112 and the second housing section end 118b of the second housing section 114 cooperate to form the second housing end 113. In other embodiments, this may not be the case, and, for example, the first housing section end 116a or 116b of at least one of the first and second housing sections 112, 114 may form the first housing end 111. Similarly, in some embodiments, the second housing section end 118a or 118b of at least one of the first and second housing sections 112, 114 may form the second housing end 113.

The first housing section ends 116a, 116b of the first and the second housing sections 112, 114 and the second housing section ends 118a, 118b of the first and the second housing sections 112, 114 may be shaped to form an opening. In some embodiments, the first housing section end 116a or 116b of only one of the first and second housing sections 112, 114 may be shaped to form an opening. In some embodiments, the second housing section end 118a or 118b of only one of the first and second housing sections 112, 114 may be shaped to form an opening. As discussed above and further herein, in some embodiments, the second housing section end 118a, 118b of at least one of the first and second housing sections 112, 114 can be configured to receive a portion of a sealing cap, e.g., the sealing cap 195, or may be formed to be closed.

The first housing section end 116a, 116b of each of the first and the second housing sections 112, 114 is configured to receive a portion of the mounting adaptor 160, and a region intermediate the first and the second housing section ends 116a, 116b, 118a, 118b of each of the first and the second housing sections 112, 114 is configured to receive a portion of the bearing 102. In other embodiments this may not be the case. For example, in some embodiments, the first housing section end 116a, 116b of at least one of the first and second housing sections 112, 114 or a region positioned towards the first housing section end 116a, 116b of at least one of the first and second housing sections 112, 114 may be configured to receive a portion of the mounting adaptor 160. In addition, or alternatively, in some embodiments, a region intermediate the first and second housing section ends 116a, 116b, 118a, 118b of at least one of the first and second housing sections 112, 114 can be configured to receive a portion of the bearing 102.

Figure 2:
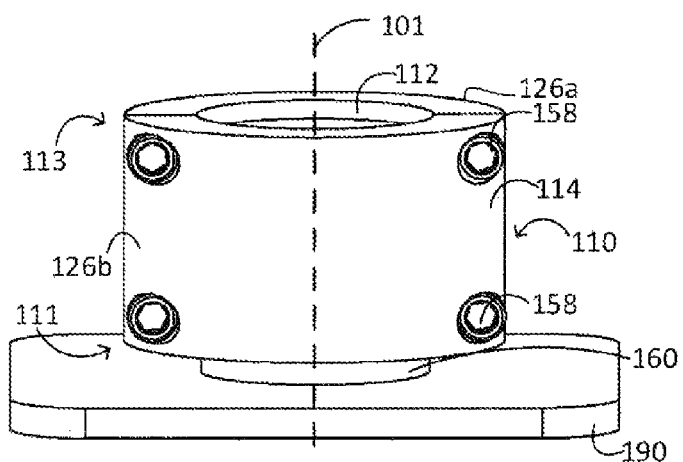
FIG. 2 is a perspective view of the bearing mount assembly of FIG. 1 showing the split bearing housing and the mounting adaptor.
Figure 3A:
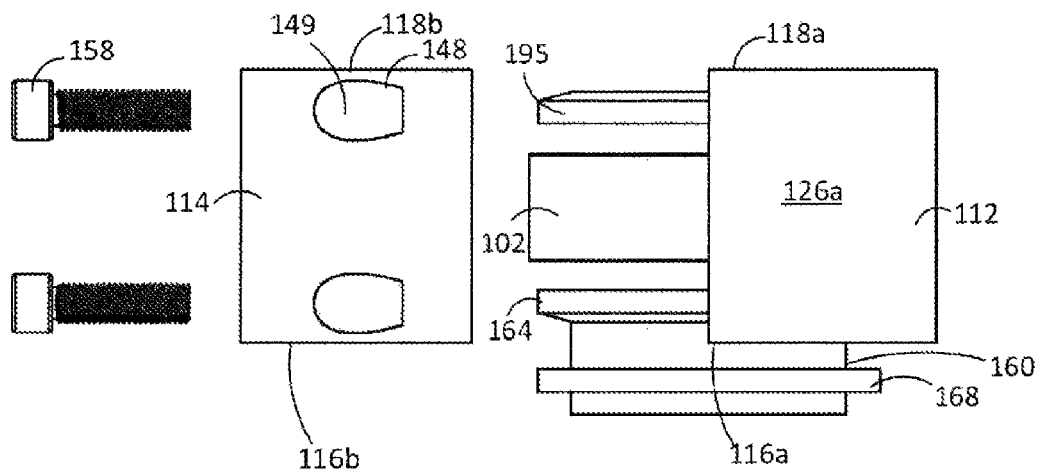
FIG. 3A is a partially exploded side view of the bearing mount assembly of FIG. 1 exposing a ball bearing, and a sealing cap.
Figure 3B:
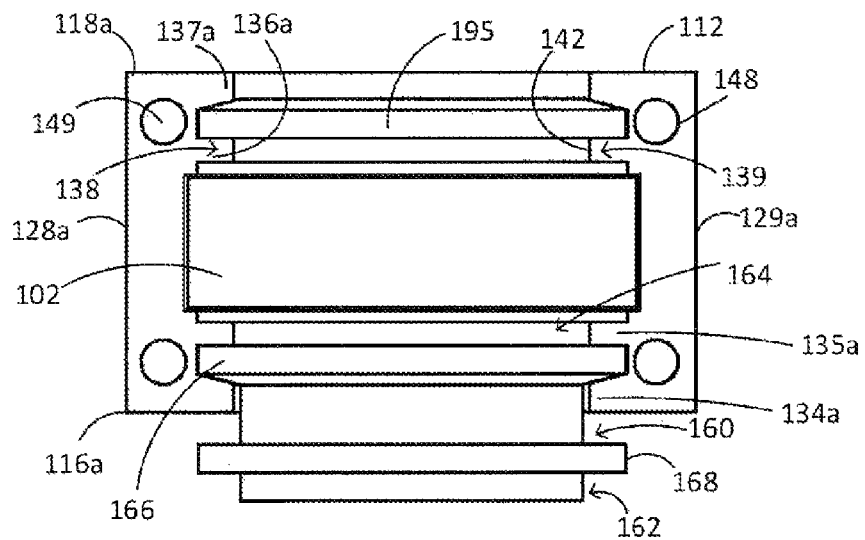
FIG. 3B is an inside view of the first housing section of the bearing housing of the bearing mount assembly of FIG. 1 when not coupled to the second housing section, the mounting adaptor, the bearing, and the sealing cap each shown to be partially received by the first housing section.

Referring still to FIGS. 1-5D, the mounting adaptor 160 generally comprises a first adaptor end 162 and a second adaptor end 164 spaced longitudinally away from the first adaptor end 162. The second adaptor end 164 is configured to be removably received by the first housing end 111 of the bearing housing 110. In other words, the second adaptor end 164 is configured such that a portion of the second adaptor end 164 is removably received by the first housing section 112 at the first housing section end 116a and a second portion is removably received by the second housing section 114 at the first housing section end 116b. The first adaptor end 162 is configured to couple the mounting adaptor 160 to a machine or a structure, e.g. machine or structure 190. For example, as shown in FIGS. 1-2, the first adaptor end 162 may be welded to the structure 190. In other embodiments, as disclosed herein, the first adaptor end 162 can be removably coupled to the structure 190 using mechanical fasteners such as, but not limited, to bolts.

Referring still to FIGS. 1-5D, the first housing section 112 and the second housing section 114 have structures that correspond to one another and are configured to receive a portion of the bearing 102 and a portion of the second adaptor end 164, as described below. For example, the first and the second housing sections 112, 114 can have structures that are mirror images of one another. In other embodiments, the first housing section 112 may be configured differently than the second housing section 114, which may be used when housing an asymmetrical bearing insert.

In the illustrated embodiment, the first housing section end 116a, 116b of each of the first and second housing sections 112, 114 generally comprises a first outer edge 120a, 120b and a first inner edge 122a, 122b spaced inwardly from the first outer edge 120a, 120b. The second housing section end 118a, 118b of each of the first and second housing sections 112, 114 generally comprises a second outer edge 121a, 121b and a second inner edge 123a, 123b spaced laterally inwardly from the second outer edge 121a, 121b. In the illustrated embodiment, each of the housing sections 112, 114 generally comprises a first end wall 124a, 124b extending between the first outer edge 120a, 120b and the first inner edge 122a, 122b and a second end wall 125a, 125b extending between the second outer edge 121a, 121b and the second inner edge 123a, 123b. In the illustrated embodiment, the first end wall 124a, 124b and the second end wall 125a, 125b are substantially orthogonal to the longitudinal axis 101 of the bearing housing 110, while in other embodiments, this may not necessarily be the case.

Each of the first and the second housing sections 112, 114 includes an outer wall 126a, 126b extending circumferentially around the longitudinal axis 101 between the first outer edge 120a, 120b and the second outer edge 121a, 121b and an inner wall 127a, 127b extending circumferentially around the longitudinal axis 101 between the first inner edge 122a, 122b and the second inner edge 123a, 123b. The outer wall 126a, 126b generally includes a first outer wall edge 128a, 128b and a second outer wall edge 129a, 129b that are substantially parallel to the longitudinal axis 101. The inner wall 127a, 127b generally includes a first inner wall edge 130a, 130b and a second inner wall edge 131a, 131b that are substantially parallel to the longitudinal axis 101. The inner wall 127a, 127b is configured to receive the bearing 102 and the second adaptor end 164 of the mounting adaptor 160.

Each of the first and the second housing sections 112, 114 further comprises a first side wall 132a, 132b and a second side wall 133a, 133b. The first side wall 132a, 132b generally extends between the first outer wall edge 128a, 128b and the first inner wall edge 130a, 130b in an axial direction and between the first end wall 124a, 124b and the second end wall 125a, 125b in the longitudinal direction, respectively. The second side wall 133a, 133b generally extends between the second outer wall edge 129a, 129b and the second inner wall edge 131a, 131b in the axial direction and between the first end wall 124a, 124b and the second end wall 125a, 125b in the longitudinal direction, respectively. In use, when the first housing section 112 and the second housing section 114 are coupled together, the first side wall 132a of the first housing section 112 abuts the first side wall 132b of the second housing section 114 and the second side wall 133a of the first housing section 112 abuts the second side wall 133b of the second housing section 114.

The housing 110 is generally in the shape of a hollow cylinder. The outer wall of the housing 110 that is formed by cooperation between the outer walls 126a, 126b of the first and the second housing sections 112, 114, when coupled together, and the inner wall of the housing 110 that is formed by cooperation between the inner walls 127a, 127b of the first and the second housing sections 112, 114, when coupled together are circular. The first outer edges 120a, 120b, the second outer edges 121a, 121b the first inner edges 122a, 122b and the second inner edges 123a, 123b are arcuate or semicircular. Accordingly, each of the first and the second housing sections 112, 114 is in the shape of a hollow semi-cylinder. Accordingly, when the first and second housing sections 112, 114 are coupled together, the cylindrical housing 110 extending along the longitudinal axis 101 is formed.

In other embodiments, the housing 110 can have any other suitable geometry or shape such as, but not limited to, a cube, cuboid, parallelepiped, pentagonal prism, hexagonal prism, sphere, and ellipsoid. In some embodiments, the housing 110 can have a shape that is a combination of these aforementioned shapes. For example, when the first and second housing sections 112, 114 are coupled together to form the housing 110, the inner wall of the housing 110 that is formed by cooperation between the inner walls 127a, 127b of each housing section can be cylindrical, while the outer wall of the housing 110 that is formed by cooperation between the outer walls 126a, 126b can be in the shape of a cuboid when viewed from the outside. Accordingly, in some embodiments the shape defined by the outer walls 126a, 126b can be different than the shape formed by the inner walls.

Referring still to FIGS. 1-5D, the inner wall 127a, 127b of the first and the second housing sections 112, 114 is configured to receive a portion of the second adaptor end 164 at or towards the first housing end 111 and a portion of the bearing 102 in a region intermediate the first housing end 111 and the second housing end 113. In this example embodiment, the inner wall 127a, 127b generally comprises a plurality of protrusions or ribs, e.g., ribs 134a, 134b, 135a, 135b, 136a, 136b, 137a, 137b projecting inwardly from the inner wall 127a, 127b. In this embodiment, since the inner wall 127a, 127b is semi-cylindrical, the ribs are projected radially inwardly. In other embodiments, the ribs can project laterally inwardly from the inner wall 127a, 127b depending at least in part on the geometry of the inner wall 127a, 127b, as discussed above and herein. The plurality of ribs are spaced longitudinally apart along the longitudinal axis 101 and are semi-annular. Accordingly, when the first and the second housing sections 112, 114 are coupled together the resulting ribs of the housing 110 are annular. In other embodiments, the ribs may be of other shapes and cross sections. For example, the ribs may be in the shape of parallelepiped projections. In alternative embodiments, the ribs may not extend along the entire circumference of the inner wall 127a, 127b and instead several tabs may be disposed circumferentially where the inner ribs are currently shown.

In this example embodiment, the plurality of ribs generally comprises at least three ribs. A first rib can be positioned at or towards the first housing end 111 while the other two ribs can be positioned in a region intermediate the first rib and the second housing end 113. In some embodiments, for example, the embodiments shown in FIGS. 1-7E, 9A-10D, and 14A-17C, each of the first and the second housing sections generally includes four ribs, namely, for example in FIGS. 1-5D, a first rib 134a, 134b, a second rib 135a, 135b, a third rib 136a, 136b, and a fourth rib 137a, 137b. In other embodiments, the housing sections 112, 114 can have less than four ribs, e.g., three ribs (as shown in FIGS. 8A, 8B and 8C and described herein), or more than four ribs (not shown).

Still referring to FIGS. 1-5D, the space between each two successive ribs of the plurality of ribs defines at least in part an arcuate, or semi-annular, groove. In other embodiments, depending on the geometry of the ribs and the housing 110, the grooves may have other shapes. As the plurality of ribs generally comprises at least three ribs, each of the first and the second housing sections 112, 114 generally comprises at least two grooves: a bearing groove 145a, 145b, and a mounting adaptor groove 146a, 146b. For example, in FIGS. 5A-5C, in each of the first and the second housing sections 112, 114, the space between the first rib 134a, 134b, and the second rib 135a, 135b, defines the mounting adaptor groove 146a, 146b while the space between the second rib 135a, 135b and the third rib 136a, 136b, defines the bearing groove 145a, 145b, respectively.

In this example embodiment, the mounting adaptor groove 146a, 146b of the first and the second housing sections 112, 114 is semi-annular and positioned towards the first housing end 111. The bearing groove 145a, 145b of the first and the second housing sections 112, 114 is semi-annular and positioned intermediate the first housing end 111 and the second housing end 113. The mounting adaptor groove 146a, 146b of the first and the second housing sections 112, 114 is configured to receive a portion of the adaptor second end 164. The bearing groove 145a, 145b of the first and the second housing sections 112, 114 is configured to receive a portion of the bearing 102. For example, the bearing groove 145a, 145b can have a width that is at most equal the width of the bearing 102 that is intended to be received by the bearing groove 145a, 145b such that the bearing 102 is received in the housing 110 in an interference fit. In some embodiments, the bearing 102 may not be received in an interference fit and the bearing groove 145a, 145b can have different width.

In some embodiments, the housing 110 can have more than two grooves, at least in part depending on the number of ribs the housing 110 has. For example, in the example embodiments illustrated in FIGS. 1-7E, 9A-10D and 14A-17C, the housing 110, for FIGS. 1-5D for example, has at least a third groove, e.g., a sealing groove 147a, 147b, defined between, e.g., the third rib 136a, 136b and the fourth rib 137a, 137b, and configured to receiving a sealing cap 195 or a pass-through sealing cap 395, as described herein. In these example embodiments, the sealing groove, e.g., sealing groove 147a, 147b, is generally defined at least in part by at least a rib, e.g., fourth rib 137a, 137b, that is positioned towards the second end 113 of the housing 110. Accordingly, the sealing groove 147a, 147b can receive a sealing cap 195 for sealing the open second end 113 of the housing from the outside environment. The sealing cap 195 can be made of any suitable material such as, but not limited to, rubber.

Referring still to FIGS. 1-5D, each of the ribs 134a, 134b, 135a, 135b, 136a, 136b, 137a, 137b, generally comprise a first rib end 138 and a second rib end 139 spaced axially away from the first rib end 138. Each rib further comprises a first end wall 140 extending between the first rib end 138 and the second rib end 139 and a second end wall 141 spaced longitudinally away from the first end wall 140 and extending between the first rib end 138 and the second rib end 139. Each rib further comprises an outer wall 142 spaced radially away from the inner wall 127a, 127b and extending longitudinally between the first end wall 140 and the second end wall 141. Each rib also comprises a first side wall 143 and a second side wall 144. The first side wall 143 generally extends longitudinally between the first end wall 140 and the second end wall 141 at the first rib end 138. The second side wall 144 generally extends longitudinally between the first end wall 140 and the second end wall 141 and between the outer wall 142 of the corresponding rib and inner wall 127 of the corresponding housing section at the second rib end 139.

Each groove can be defined in the space partially bounded by, e.g., second side wall 141 of a rib, first side wall 140 of a next rib and an interior wall therebetween in the plurality of longitudinally spaced apart ribs.

In some embodiments, for example, the embodiments shown in FIGS. 1-10D and 14A-17C, but now describing the embodiment shown in FIGS. 1-5D as an example, the first side wall 140 of each rib of the plurality of ribs is positioned to face towards the first housing end 111, e.g., first rib 138a, 138b, can be flush with the first end wall 124a, 124b of the corresponding housing section 112 and 114, respectively. Accordingly, if, as in the illustrated embodiments, the rib positioned towards the first housing end 111 is semi-annular, upon coupling the first housing section 112 and the second housing section 114 together, the opening at the first housing end 111, discussed above, is circular. In other embodiments, the first side wall 140 of the aforementioned rib may not be flush with the first end wall 124*a*, 124*b*. In some embodiments, such as those shown in FIGS. 1-10D and 14A-17C, the rib positioned towards the first housing end can be integrally formed with the first end wall while in some other embodiments it may not be the case.

In some embodiments, such as those shown in FIGS. 1-10D, and 14A-17C, but referring now to the example embodiment shown in FIGS. 1-5D, the second side wall 141 of the rib that is positioned towards the second housing end 113, e.g., fourth rib 137*a*, 137*b*, can be flush with the second end wall 125*a*, 125*b* of the corresponding housing section. Accordingly, if the rib positioned towards the second housing end 113 is semi-annular, and upon coupling the first and the second housing sections 112, 114 together, the opening at the second housing end 113 is circular. In some embodiments, such as the embodiments shown in FIGS. 1-10D and 14A-17C, the rib positioned towards the second housing end can be integrally formed with the second end wall while in some other embodiments it may not be the case.

In some embodiments, such as those shown in FIGS. 1-10D, and 14A-17C, but now referring to the example embodiment shown in FIGS. 1-5D for illustrative purposes, the first end wall 143 and the second end wall 144 of each rib can be flush with the first side wall 132*a*, 132*b* and second side wall 133*a*, 133*b* of the corresponding housing section. In other embodiments, this may not be the case and the first end wall 143 and the second end wall 144 of each rib may abut against the inner wall 127*a*, 127*b* at a non-zero angle. In some embodiments such as the embodiments shown in FIGS. 1-10D and 14A-17C, but now referring to the example embodiment shown in FIGS. 1-5D for illustrative purposes, the first and second end walls 143, 144 of each rib can be integral with the first and second side walls 132*a*, 132*b*, 133*a*, 133*b*, respectively, of each of the first and the second housing sections 112, 114, while, in other embodiments, this may not be the case.

Referring now to FIGS. 1-3B and 11A-11B, the mounting adaptor 160 generally comprises a first adaptor end 162 and a second adaptor end 164 spaced longitudinally away from the first adaptor end 162. The mounting adaptor 160 can be used with the housing 110 or any other bearing housing disclosed herein. In FIGS. 1-3B, a mounting flange 168 is positioned towards the first adaptor end 162. The mounting flange 168 is configured to secure the mounting adaptor 160 to a structure or machine, e.g., structure 190. In the illustrated embodiment, the mounting flange 168 is annular while in other embodiments it can have other shapes, e.g., rectangular, square, oval, etc. depending at least in part on the geometry and/or shape of the machine or the structure. In the illustrated embodiment, the mounting adaptor 160 can be called a weldment adaptor since it can be welded to a structure such as structure 190 in FIGS. 1-3B, for example. In other embodiments, the mounting flange can be removably coupled to a structure or a machine.

In the illustrated example embodiment, a housing flange 166 is positioned towards the second adaptor end 164. The housing flange 166 is configured to be received by the first and the second housing sections 112, 114 to removably couple the mounting adaptor 160 to the bearing housing 110. In the illustrated embodiment, the housing flange 166 is annular since, at least in part, the mounting adaptor groove 146*a*, 146*b* is annular. In other embodiments, depending on the shape of the mounting adaptor groove and/or ribs partly defining it, the housing flange 166 can have other shapes.

The first and second adaptor ends 162, 164 are open or each include an opening, which in this example is a circular opening. However, in alternative embodiments, the first and second adaptor ends 162, 164 may be closed.

Referring to FIGS. 11A-11B, the mounting adaptor 160 may include a main body 161 located intermediate the first and second adaptor ends 162, 164. The main body 161 includes an inner perimeter 167 defining, at least in part, an aperture 169 that is in fluid communication with the openings of the first and second adaptor ends 162, 164 for receiving a shaft that is intended to be borne by the bearing within the housing, e.g., shaft 198 and bearing 102 (see FIG. 1, e.g.). The main body 161 is a hollow cylinder. By cooperation of the aperture 169 of the main body 161 with the open first and second adaptor ends 162, 164, a cylindrical shaft, e.g., shaft 198, can pass through the aperture 169 of the mounting adaptor 160. In other embodiments, the main body 161 can have other shapes and/or can be solid, i.e. a shaft may not pass through the main body 161. Further, in other embodiments, the first and second adaptor ends 162, 164 can be closed. In the illustrated embodiment, the mounting flange 168 and the housing flange 166 are projected radially outwardly from the main body 161 and are integrally formed with the main body 161, while in other embodiments they may not be integrally formed with the main body 161. In the illustrated embodiment, the housing flange 166 includes a first flange face 163*a* tapered to the main body 161 and a second flange face 163*b* being substantially perpendicular to the longitudinal axis of the main body 161.

The width of the housing flange 166 is configured to be equal to or less than the width of the mounting adaptor groove 146*a*, 146*b*. In the illustrated embodiment, the width of the housing flange 166 increases in the direction from its radial extent to the main body 161 due to the tapered first flange face 163*a*. Accordingly, the mounting adaptor groove 146*a*, 146*b* can be similarly tapered such that its width is consistently equal to or greater than the width of the housing flange 166. In the illustrated embodiment, the radial extent of the housing flange 166 extends past the radial extent of the inner wall 127*a*, 127*b* of the first and second housing sections 112, 114 and extends into the mounting adaptor groove 146*a*, 146*b*. In the configuration described herein, when the housing flange 166 is inserted into the first or the second housing sections 112, 114 and the other housing section is coupled to the housing section that already received a portion of the housing flange 166, the mounting adaptor 160 can be secured to the housing 110 in a mechanically stable manner, including radially and axially aligned, to reduce any potential backlash. In other embodiments, the width of the housing flange 166 and its radial extent can be configured such that the mounting flange can be inserted into the housing 110 through interference fit or any other interlocking configuration known in the art.

Referring still to FIGS. 1-5D and 11A-11B, in use, in order to house a bearing, e.g., bearing 102, in a housing, e.g., the housing 110 or any other housing disclosed herein, and retain the bearing at a fixed location relative to a structure, e.g., structure 190, the bearing 102 can be placed within one housing section, e.g., first housing section 112. Thereafter, a mounting adaptor, e.g., the mounting adaptor 160 or any other mounting adaptor disclosed herein, can be coupled to the structure through its mounting flange, e.g., mounting flange 168. For example, as discussed herein, the mounting flange 168 can be welded to the structure or can be removably coupled to the structure through, e.g., using mechanical fasteners such as bolts, screws, etc. Then, the housing flange of the mounting adaptor, e.g., housing flange 166, can be preferably placed in the mounting adaptor groove, for example mounting adaptor groove 146a, 146b, of the housing section that already received the bearing, e.g., first housing section 112. The other housing section, e.g., the second housing section 114, can then be coupled to the first housing section 112 to secure the housing flange 166.

Accordingly, when the first and the second housing sections, e.g., housing sections 112, 114, are coupled together, the bearing, e.g., bearing 102, and the housing flange, e.g., housing flange 166, are sandwiched between the first and the second housing sections and are housed or received within the housing, e.g., housing 110. It should also be noted that a shaft, such as shaft 198 shown in FIG. 1, can be inserted to bear against the bearing, e.g., bearing 102, either before or after coupling the first and the second housing sections 112, 114 together. In some embodiments where the housing sections include a sealing groove, e.g., sealing groove 147a, 147b, before coupling the housing sections 112, 114 together, a sealing cap, e.g., sealing cap 195, 395, 595 can be placed in a sealing groove of one of the housing sections, preferably the housing section that already received a portion of the bearing 102 and the housing flange 166. In some embodiments, the mounting adaptor 160 can be coupled to the structure before being removably received by the bearing housing 110 while in some embodiments the mounting adaptor 160 can be first removably received by the bearing housing 110 and then coupled to the structure.

In use, as the mounting adaptor, e.g., mounting adaptor 160, is removably received by the housing 110, regardless of whether the mounting adaptor is removably or fixedly coupled to the structure, the bearing 102 within the housing 110 can be easily accessed by merely decoupling at least one of the housing sections 112, 114 without necessarily requiring decoupling the mounting adaptor 160 from the machine or the structure. Alternatively, or in addition, if the bearing housing 110, e.g., includes an open second housing end then the side of the bearing facing the opening can be accessed without decoupling the housing sections 112, 114 from each other.

Referring now to FIGS. 1-10D and 15A-15D, but now referring to the example embodiment shown in FIGS. 1-5D for illustrative purposes, to couple the first housing section, e.g., housing section 112, and the second housing section, e.g. housing section 114, together and sandwich the bearing and the housing flange, e.g. housing flange 166, of the mounting adaptor, e.g. mounting adaptor 160, therebetween, a number of mechanical fasteners, such as bolts, screws, etc. can be used. For example, referring to FIGS. 1-5D, a plurality of inner perimeters 148 on first and second side walls 132a, 132b, 133a, 133b of each of the first and the second housing sections 112, 114 at least partly define a plurality of bores 149 for receiving fasteners, e.g., fasteners 158. For example, each side wall 132a, 132b, 133a, 133b, has two bores 149, i.e. each housing section 110, 112 has four bores 149 and the housing sections 112, 114 are coupled together through using four fasteners 158. In other embodiments, as disclosed herein (e.g., the embodiment shown in FIGS. 8A-8D and 15A-15D), housing sections may have a different numbers of bores 149 that are more or less than four. In some embodiments, the housing sections may not have bores for receiving fasteners at all and may be coupled together through other means known in the art and disclosed herein.

In these example embodiments, the bores 149 of the first housing section 112 are threaded while the bores 149 of the second housing section 114 are non-threaded and the fastener 158 can be a screw. In other embodiments, the bores 149 of the first housing section 112 can also be non-threaded. In some embodiments, a bolt and a corresponding nut, such as the example embodiment shown in FIGS. 15A-15D, or any other interlocking member known in the art, such as those shown in the example embodiments of FIGS. 14A-140 and 16A-17C, can be used instead of a screw. For example, in some other embodiments, the first and second housing sections 112, 114 do not have bores 149 and can be coupled together through a clamp band wrapping around both the housing sections 112, 114 and securing them together as shown in FIGS. 14A-14D. As another example, in other embodiments, an eccentric locking collar around the outer wall 126a, 126b of the first and the second housing sections 112, 114 can secure the housing sections 112, 114 together as shown in FIGS. 17A-17C. As another example, in some other embodiments, outer walls 126a, 126b of the housing sections 112, 114 can be hingedly connected together, a hasp can be mounted on one of outer wall 126a, 126b of the housing sections opposite the hinge, and a staple can be mounted on the other of outer wall 126a, 126b at a location corresponding to the hasp.

As another example, in some other embodiments, outer walls 126a, 126b of the housing sections 112, 114 can be hingedly connected together. This can be done by mounting a toggle bolt (not shown) on outer wall 126a, 126b of one of the housing sections 112, 114 opposite the hinge, and a strike (not shown) can be mounted on outer wall 126a, 126b of the other housing section 112, 114 at a location corresponding to the toggle bolt.

In the example embodiment illustrated in FIGS. 1-5D, the housing 110 receives a conventional ball bearing, e.g., bearing 102. In other embodiments, the housing 110 can be modified to receive other types of bearings. For example, the inner wall 127a, 127b, the plurality of ribs, and/or the bearing groove 145a, 145b can be modified to receive other types of bearings. For instance, the housing 210 shown in FIGS. 6A-6d receives a linear bearing 202, the housing 310 shown in FIGS. 7A-7E receives a plain bearing 302, the housing 410 shown in FIGS. 8A-8D receives a spherical bearing 402, the housing 510 shown in FIGS. 9A-9E receives a tapered roller bearing 502, and the housing 610 shown in FIGS. 10A-10D receives a thrust bearing 602. In other embodiments, the split bearing housing can be modified to receive any bearing known in the art, e.g., a spherical ball bearing, a cylindrical ball bearing, a thrust bearing, a linear bearing, a tapered roller bearing, angular contact bearing or a plain bearing constructed of various materials. In some embodiments, the split housing can receive sealed bearings while, alternatively, or in addition thereto, the housing can receive non-sealed bearings.

Referring now to FIGS. 6A-6B, another example bearing mount apparatus 200 is illustrated. Certain elements of the apparatus 200 that are similar to those in the bearing mount apparatus 100 are referred to using like reference numerals, incremented by 100. To avoid repetition, the similar elements are not discussed in as much detail. Unless otherwise stated below, all the teachings disclosed herein with relation to the bearing mount apparatus 100, or any other bearing mount apparatuses disclosed herein, can apply to the bearing mount apparatus 200 as well.

The bearing mount apparatus 200 generally comprises a split bearing housing 210 and a mounting adaptor 160, although other mounting adaptors disclosed herein, e.g., mounting adaptor 260, 360, can be used in conjunction with the bearing housing 210. The bearing housing 210 is configured to receive a linear bearing 202. Both the first housing end 211 and the second housing end 213 are open. Accordingly, in use, the bearing 202 can be accessed from the second housing end 213 without the need to decouple the first and the second housing sections of the housing 210. In other embodiments, the second housing end 213 can be closed or can be covered by a sealing cap, e.g. the sealing cap 195.

The housing 210 includes a first rib 234a, 234b positioned towards the first housing end 211, a second rib 235a, 235b intermediate the first housing end 211 and the second housing end 213, a third rib 236a, 236b positioned towards the second housing end 213 and a forth rib 237a, 237b at the second housing end 213. The space between the first rib 234a, 234b and the second rib 235a, 235b defines the mounting adaptor groove, the space between the second rib 235a, 235b and the third rib 236a, 236b defines the bearing groove 245a, 245b, and the space between the third rib 236a, 236b and the fourth rib 237a, 237b defines the sealing cap groove. Similar to the embodiment illustrated in FIGS. 1-4, each of the first and the second housing sections of the housing 210 can include a number of inner perimeters 248 on side walls 232a, 232b and 233a, 233b defining at least in part bores 249 for receiving fasteners 258 for coupling the housing sections together.

Referring now to FIGS. 7A-7E, shown therein is another example bearing mount apparatus 300. Certain elements of the apparatus 300 that are similar to those in the bearing mount apparatus 200 have like reference numerals that are incremented by 100. To avoid repetition, the similar elements are not discussed in as much detail. Unless otherwise stated below, all the teachings disclosed herein with relation to the bearing mount apparatuses 100, 200 or any other bearing mount apparatuses disclosed herein, can apply to the bearing mount apparatus 300 as well.

The bearing mount apparatus 300 generally comprises a split bearing housing 310 and a mounting adaptor 160, although other mounting adaptors disclosed herein, e.g., mounting adaptor 260, 360, can be used in conjunction with the bearing housing 310. The bearing housing 310 is configured to receive a plain bearing 302. Both the first and second housing ends 311, 313 of the housing 310 are open and a sealing cap 395 having an aperture 395a covers the open second housing end 313. The sealing cap 395 is a pass-through sealing cap. Accordingly, in use, a shaft, such as shaft 198, can pass through the sealing cap 395 or the bearing 302 can be accessed through the opening of the sealing cap 395 if a shaft is not passing through the sealing cap 395. In other embodiments, a sealing cap such as sealing cap 195 that is completely closed can be used to completely seal the interior of the housing 310 from the outside environment. In other embodiments, the second housing end 313 can be closed in which case a sealing cap is not used.

The housing 310 includes a first rib 334a, 334b positioned towards the first housing end 311, a second rib 335a, 335b intermediate the first housing end 311 and the second housing end 313, a third rib 336a, 336b intermediate the second rib 335a, 335b and the second housing end 313, and a fourth rib 337a, 337b positioned towards the second housing end 313. The space between the first and second ribs 334a, 334b, and 335a, 335b defines the mounting adaptor groove and the space between the third and fourth ribs 336a, 336b and 337a, 337b defines the sealing groove. In the embodiment illustrated, the second side wall of the second rib 335a, 335b has a stepped portion 350a 350b and the first side wall of the third rib 336a, 336b has a stepped portion 351a, 351b. The space defined between the stepped portions 350a, 350b and 351a, 351b defines the bearing groove, which is made up of two halves 354a and 354b. In other embodiments, the ribs may not have stepped portions and the space between the ribs themselves can define the grooves. Similar to the embodiments illustrated in FIGS. 1-6D, each of the first and the second housing sections of the housing 310 can include a number of inner perimeters 348 on side walls 332a, 332b and 333a, 333b defining at least in part bores 349 for receiving fasteners 358 to couple the housing sections together.

Referring now to FIGS. 8A-8D, another example bearing mount apparatus 400 is illustrated. Certain elements of the apparatus 400 that are similar to those of the bearing mount apparatus 300 have like reference numerals, incremented by 100. To avoid repetition, the similar elements are not discussed in as much detail. Unless otherwise stated below, all the teachings disclosed herein with relation to the bearing mount apparatuses 100, 200, 300 or any other bearing mount apparatus disclosed herein, can apply to the bearing mount apparatus 400 as well.

The bearing mount apparatus 400 generally comprises a split bearing housing 410 and a mounting adaptor 160, although other mounting adaptors disclosed herein, e.g., mounting adaptor 260, 360, can be used in conjunction with the bearing housing 410. The bearing housing 410 is configured to receive a spherical bearing 402. Both the first and second housing ends 411, 413 of the housing 410 are open. In use, the bearing 402 can be accessed for, e.g., maintenance, lubrication, cleaning, etc., through the open second housing end 413 without having to decouple the first and second housing sections of the housing 410. In other embodiments, a sealing cap such as sealing cap 195 that is closed can be used to completely seal the interior of the housing 410 from the outside environment. In other embodiments, the second housing end 413 can be closed.

In the illustrated embodiment, the housing 410 includes a first rib 434a, 434b positioned towards the first housing end 411, a second rib 435a, 435b intermediate the first and second housing ends 411, 413 and a third rib 436a, 436b positioned towards the second housing end 413. The space between the first and second ribs 434a, 434b and 435a, 435b defines the mounting adaptor groove. Rib 435a, 435b is connected to rib 436a, 436b through an arcuate connecting surface 452a, 452b. The arcuate connecting surface 452a, 452b and the second and third ribs 435a, 435b, and 436a, 436b define the bearing groove 445a and 445b. Similar to the embodiments illustrated in FIGS. 1-7E, each of the first and second housing sections of the housing 410 can include a number of inner perimeters 448 on side walls 432a, 432b and 433a, 433b defining at least in part bores 449 for receiving fasteners 458 to couple the housing sections together. Each housing section has two bores 449, although each housing section can have more or less than two bores 449 in alternative embodiments.

Referring now to FIGS. 9A-9E, another example bearing mount apparatus 500 is illustrated. Certain elements of the apparatus 500 that are similar to those in the bearing mount apparatus 400 have like reference numerals, incremented by 100. To avoid repetition, the similar elements are not discussed in as much detail. Unless otherwise stated below, all the teachings disclosed herein with relation to the bearing mount apparatuses 100, 200, 300, 400 or any other bearing mount apparatus disclosed herein, can apply to the bearing mount apparatus 500 as well.

The bearing mount apparatus 500 generally comprises a split bearing housing 510 and a mounting adaptor 560, although other mounting adaptors disclosed herein, e.g., mounting adaptor 260, 360, can be used in conjunction with the bearing housing 510. The bearing housing 510 is configured to receive a tapered roller bearing 502. Both the first and second housing ends 511, 513 of the housing 510 are open. A sealing cap 595 having aperture 595*a*, which can be similar to sealing cap 395, covers the open second housing end 513. The sealing cap 595 is a pass-through sealing cap. Accordingly, in use, a shaft, such as shaft 198, can pass through the sealing cap 595 or the bearing 502 can be accessed through the opening of the sealing cap 595 if a shaft is not passing through the sealing cap 595. In other embodiments, a sealing cap such as the sealing cap 195 that is completely closed can be used to completely seal the interior of the housing 510 from the outside environment. In other embodiments, the second housing end 513 can be closed.

The housing 510 includes a first rib 534*a*, 534*b* positioned towards the first housing end 511, a second rib 535*a*, 535*b* intermediate the first and second housing ends 511, 513, a third rib 536*a*, 536*b* intermediate the second rib 535*a*, 535*b* and the second housing end 513, and a fourth rib 537*a*, 537*b* positioned towards the second housing end 513. The space between the first and second ribs 534*a*, 534*b* 535*a*, 535*b* defines the mounting adaptor groove and the space between the third and fourth ribs 536*a*, 536*b*, 537*a*, 537*b* defines the sealing groove for receiving the sealing cap 595. The second side wall of the second rib 535*a*, 535*b* has a stepped portion 550*a*, 550*b* and the first side wall of the third rib 536*a*, 536*b* has a stepped portion 551*a*, 551*b*. The space defined between the stepped portion 550*a*, 550*b* and the stepped portion 551*a*, 551*b* defines the bearing groove 545*a* and 545*b*. In other embodiments, the ribs may not have stepped portions and the space between the ribs themselves can define the grooves. Similar to the embodiments illustrated in FIGS. 1-4 and 6A-8D, each of the first and the second housing sections of the housing 510 can include a number of inner perimeters 548 on side walls 532*a*, 532*b* and 533*a*, 533*b* defining at least in part bores 549 for receiving fasteners 558 to couple the housing sections together.

Referring now to FIGS. 10A-10D, another example bearing mount apparatus 600 is illustrated. Certain elements of the apparatus 600 that are similar to those in the bearing mount apparatus 500 have like reference numerals, incremented by 100. To avoid repetition, similar elements are not discussed in as much detail. Unless otherwise stated below, all the teachings disclosed herein with relation to the bearing mount apparatuses 100, 200, 300, 400, 500 or any other bearing mount apparatus disclosed herein, can apply to the bearing mount apparatus 600 as well.

The bearing mount apparatus 600 generally comprises a split bearing housing 610 and a mounting adaptor 160, although other mounting adaptors disclosed herein, e.g., mounting adaptor 260, 360, can be used in conjunction with the bearing housing 610. The bearing housing 610 is configured to receive a thrust bearing 602. The first housing end 611 is open while the second housing end 613 of is closed. In other embodiments, the second housing 613 can be open and configured to receive a sealing cap such as sealing cap 195, 395.

The housing 610 includes a first rib 634*a*, 634*b* positioned towards the first housing end 611, a second rib 635*a*, 635*b* intermediate the first and second housing ends 611, 613, and a third rib 636*a*, 636*b* positioned towards the second housing end 613. The space between the first and second ribs 634*a*, 634*b*, 635*a*, 635*b* defines the mounting adaptor groove. The second side wall of the second rib 635*a*, 635*b* has a stepped portion 650*a*, 650*b* and the first side wall of the third rib 636*a*, 636*b* has a stepped portion 651*a*, 651*b*. The stepped portion 651*a*, 651*b* is connected to and integrally formed with the stepped portion 650*a*, 650*b*. The space between the stepped portions 650*a*, 650*b* and 651*a*, 651*b* defines the bearing groove 645*a*, 645*b* for receiving the bearing 602. This configuration is at least in part dictated by the specific shape of the bearing 602. Accordingly, the housing 610, in other embodiments, may have other types of rib arrangements and configurations, e.g., similar to those described herein in relation to other housings. For example, in other embodiments, the ribs may not have stepped portions and the space between the ribs themselves can define the grooves. The second end wall of the third rib 636*a*, 636*b* extends both laterally and axially at the second housing end 613 of the housing 610 to close the second housing end 613. Similar to the embodiments illustrated in FIGS. 1-4 and 6A-9E, each of the first and the second housing sections of the housing 610 can include a number of inner perimeters 648 on side walls 632*a*, 632*b* and 633*a*, 633*b* defining at least in part bores 649 for receiving fasteners 658 to couple the housing sections together.

Referring now to FIGS. 12A and 12B, another example mounting adaptor 260 is shown. Certain elements of the adaptor 260 that are similar to those in the mounting adaptor 160 have like reference numerals, incremented by 100. To avoid repetition, the similar elements are not discussed in as much detail. Unless otherwise stated below, all the teachings disclosed herein with relation to the mounting adaptor 160 can apply to the mounting adaptor 260 as well. For example, the mounting adaptor 260 can be used in conjunction with all of the bearing housings disclosed herein, such as bearing housing 110, 210, 310, 410, 510, and 610.

The mounting adaptor 260 generally comprises first and second adaptor ends 262 and 264 spaced longitudinally away from the first adaptor end 262. In the illustrated embodiment, a mounting flange 268 is positioned towards the first adaptor end 262. As discussed herein, the mounting flange 268 is configured to secure the mounting adaptor 260 to a structure or machine, e.g., structure 190. In the illustrated embodiment, the mounting flange 268 is square or rectangular while in other embodiments it can have other shapes, e.g., annular, rectangular, oval, etc., depending at least in part on the machine or the structure the first adaptor end 262 is intended to be coupled to. This way, without modifying the machine or the structure, the mounting adaptor 260 or its mounting flange 268 can be modified. Further, by being able to modify the mounting adaptor 260, the same bearing housing can be used in various applications. In the illustrated embodiment, the mounting flange 268 can be removably coupled to a structure through using mechanical fasteners such as bolts, screws, etc., as discussed in more detail below.

In the illustrated embodiment, a housing flange 266 is positioned towards the second adaptor end 264. The housing flange 266 is configured to be received by the first and the second housing sections, e.g., first and the second housing sections 112, 114, to removably couple the mounting adaptor 260 the bearing housing, e.g., housing 110. In the illustrated embodiment, the housing flange 266 is annular and can be similar to the housing flange 166. In other embodiments, at least in part depending on the shape of the mounting adaptor groove of the housing sections, and the ribs partly defining it, the housing flange 266 can have other shapes. The first adaptor end 262 and the second adaptor end 264 are open or include openings, which may be circular openings.

The mounting adaptor further comprises a main body 261 located intermediate the first and second adaptor ends 262, 264. The main body 261 includes an inner perimeter 267 defining, at least in part, an aperture 269 in fluid communication with the openings of the first and the second adaptor ends 262, 264 for receiving a shaft that is intended to be borne by the bearing within the housing, e.g., shaft 198. The main body 261 is a hollow cylinder. By cooperation of the aperture 269 of the main body 261 with the open first and second adaptor ends 262, 264, a cylindrical shaft, e.g., shaft 198, can pass through the aperture 269 of the mounting adaptor 260. In other embodiments, the main body 261 can have any other shape and/or can be solid, i.e. a shaft may not pass through the main body 261. In other embodiments, the first and second adaptor ends 262, 264 can be closed.

The mounting flange 268 projects laterally and axially outwardly from the main body 261 and the housing flange 266 projects radially outwardly from the main body 261. Both the mounting flange 268 and the housing flange 266 are integrally formed with the main body 261, while in other embodiments they may not be integrally formed with the main body 261. The mounting flange 268 includes a number of inner perimeters 270 defining at least in part bores 271 for receiving fasteners to secure the mounting adaptor 260 to a structure or a machine. This allows the mounting adaptor 260 and/or the bearing housing coupled to the mounting adaptor 260 to be removably decoupled from the machine or structure, which helps for easy maintenance, and access to the bearing. In use, the mounting adaptor 260 can be coupled to the structure first and can then be received by the bearing housing. Alternatively, the mounting adaptor 260 can be received by the bearing housing first and can then be coupled to the structure.

A width of the housing flange 266 is configured to be equal to or less than a width of the mounting adaptor groove. In the illustrated embodiment, the housing flange 266 includes a first flange face 263a tapered to the main body 261 and a second flange face 263b being substantially perpendicular to the longitudinal axis of the main body 261. The width of the housing flange 266 increases in the direction from its radial extent to the main body 261 due to the tapered first flange face 263a. Accordingly, the mounting adaptor groove, e.g., mounting adaptor groove 146a, 146b, can be similarly tapered such that its width is consistently equal to or greater than the width of the housing flange 166. A radial extent of the housing flange 266 plus a radius of the main body 261 is configured to be equal or less than a radial extent between the longitudinal axis of the bearing housing, for example, longitudinal axis 101, and inner wall of each of the first and second housing sections, e.g., inner wall 127, at the location of the mounting adaptor groove, e.g., mounting adaptor groove 146a, 146b. Accordingly, when the housing flange 266 is inserted into the first or second housing section and the other housing section is coupled to the housing section that already received a portion of the housing flange 266, the mounting adaptor 260 can be secured to the housing in a mechanically stable manner, including radially and axially aligned, to reduce any potential backlash. In other embodiments, the width of the housing flange 266 and its radial extent can be configured such that the mounting flange can be inserted into the housing through an interference fit or any other interlocking configuration known in the art.

Figure 13A:
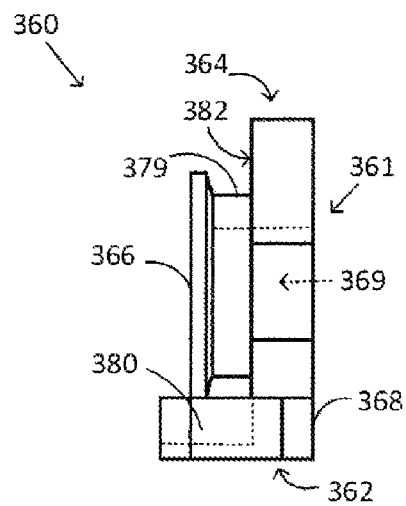
FIG. 13A is a side view of another example mounting adaptor.
Figure 13B:
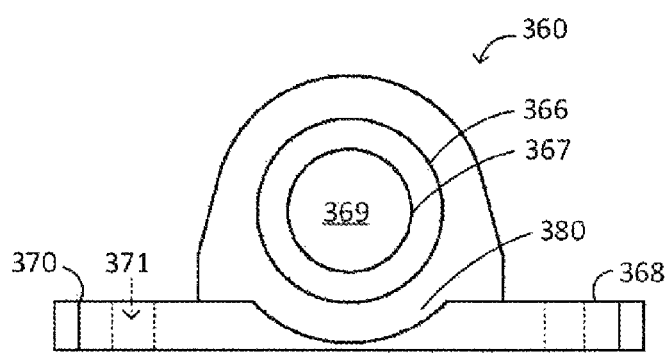
FIG. 13B is an alternate view of the mounting adaptor of FIG. 13A.

Referring now to FIGS. 13A and 13B, another example mounting adaptor 360 is shown. Certain elements of the adaptor 360 that are similar to those in the mounting adaptor 260 have like reference numerals, incremented by 100. To avoid repetition, the similar elements are not discussed in as much detail. Unless otherwise stated below, all of the teachings disclosed with relation to the mounting adaptor 160 and 260 can apply to the mounting adaptor 360 as well. For example, the mounting adaptor 360 can be used in conjunction with all of the bearing housings disclosed herein, such as bearing housing 110, 210, 310, 410, 510, and 610.

The mounting adaptor 360 generally comprises first and second adaptor ends 362, 364. A mounting flange 368 is positioned towards the first adaptor end 362. In the illustrated embodiment, the mounting flange 368 is rectangular while in other embodiments it can have other shapes, e.g., annular, square, oval, etc. As discussed herein, the mounting flange 368 is configured to secure the mounting adaptor 360 to a structure or machine, e.g., structure 190. The mounting flange 368 can be removably coupled to a structure through using mechanical fasteners such as bolts, screws, etc., as discussed in more detail below. The mounting adaptor 360 can be called a pillow block-shaped adaptor as its overall shape resembles a pillow block. The mounting adaptor 360 can be used, e.g., with structures or machines designed for receiving a pillow block or a plumber housing without requiring the machine or structure to undergo modification.

A housing flange 366 is positioned towards the second adaptor end 364. The housing flange 366 is configured to be received by the first and the second housing sections, e.g., the first and second housing sections 112, 114, to removably couple the mounting adaptor 360 to the housing, e.g., housing 110. In the illustrated embodiment, the housing flange 366 is annular and can be similar to the housing flange 166, 266. In other embodiments, at least in part depending on the shape of the mounting adaptor groove of the housing sections, and the ribs partly defining it, the housing flange 366 can have other shapes. The first adaptor end 362 comprises a mounting flange 368 that includes a number of inner perimeters 370 defining at least in part bores 371 for receiving fasteners to secure the mounting flange 368 to a structure. The mounting flange 368 also includes a recess 380 for accommodating a portion of the outer wall of the bearing housing, e.g., outer wall 126a, 126b when the bearing housing is coupled to the mounting adaptor. The mounting flange is shown as being rectangular but it may have other shapes in other embodiments.

The mounting adaptor 360 further comprises a main body 361 located intermediate the first and second adaptor ends 362, 364. The main body 361 includes the mounting flange 368, which is generally disposed towards the first adaptor end 362, and a housing flange portion 382, which is generally disposed towards the second adaptor end 364. The mounting flange 368 projects outwardly from the mounting flange portion 381 of the main body 361. The housing flange 366 is connected to the main body 361 through a neck 379 that projects outwardly from the housing flange portion 382 of the main body 361. The neck 379 is cylindrical but it might be different in other embodiments. In the illustrated embodiment, the neck 379, the mounting flange 368, and the housing flange 366 are integrally formed with the main body 361, while in other embodiments this may not necessarily be the case.

A width of the housing flange 366 is configured to be equal or less than a width of the mounting adaptor groove. A radial extent of the housing flange 366 plus a radius of the neck 379 is configured to be equal or less than a radial extent between the longitudinal axis of the bearing housing, for example, longitudinal axis 101, and the inner wall of each of the first and second housing sections, e.g., inner wall 127a, 127b at the location of the mounting adaptor groove, e.g., mounting adaptor groove 146a, 146b. Accordingly, when the housing flange 366 is inserted into the first or second housing section and the other housing section is coupled to the housing section that already received a portion of the housing flange 366, the mounting adaptor 360 can be secured to the housing in a mechanically stable manner to reduce any potential backlash. In other embodiments, the width of the housing flange 366 and its radial extent can be configured such that the mounting flange can be inserted into the housing through an interference fit or any other interlocking configuration known in the art.

Referring now to FIGS. 14A-14D, shown therein are views of an alternative example embodiment of the bearing mount apparatus 700 in which a clamp band 701 is used to secure housing sections 712 and 714 by clamping them together. The bearing mount apparatus 700 is similar to the bearing mount assembly 100. The elements of the bearing mount apparatus 700 that are similar to those in the bearing mount apparatus 100 have like reference numerals, incremented by 600. For example, the bearing mount apparatus 700 comprise ribs 734b, 735b, 736b and 737b as well as a first side wall 732b and a second side wall 733b. However, to avoid repetition, the similar elements are not discussed. The teachings disclosed herein with relation to the bearing mount apparatuses 100, 200, 300, 400, 500, 600 or any other bearing mount apparatus disclosed herein, can generally apply to the bearing mount apparatus 700 as well. It should be noted that in an alternative embodiment, the clamp band can be fastened using different elements such as incorporating an over center draw lever device. Also, this clamping technique of securing the housing sections together can be used with the bearing mount apparatuses 100, 200, 300, 400, 500 and 600 instead of the fasteners 158, 258, 358, 458, 558 and 658 and corresponding bores 149, 249, 349, 449, 549 and 649.

The clamp 701 comprises a ring 701r with coupling members 701a and 701b that are at either end of the ring 701r and are disposed adjacent to one another. The coupling members 701a and 701b have apertures (not shown) that are aligned with one another such that a fastener 701f can releasably engage the coupling members 701a and 701b to secure the ring 701r to the housing sections 712 and 714 to hold them together. The housing sections 712 and 714 can also have grooves 712g and 714g, respectively, that are sized to receive the ring 701r which allows the ring 701r to more firmly secure the housing sections 712 and 714 together. To better secure the two housing sections 712 and 714 together, the housing sections 712 and 714 may also include posts 748p, that engage the bores 749 when the two housing sections 712 and 714 face one another.

Figure 15B:
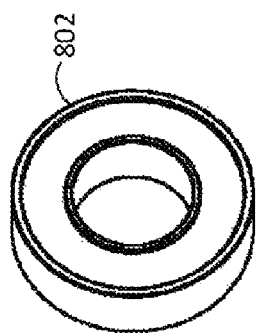
FIG. 15B is a perspective view of the bearing insert of the bearing mount assembly of FIG. 15A.
Figure 15A:
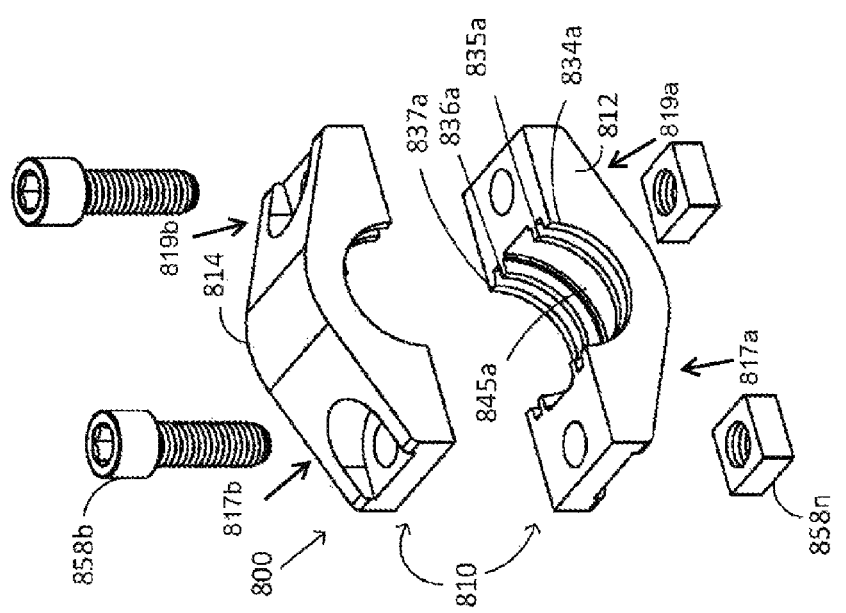
FIG. 15A is an exploded perspective view of an alternative example embodiment of a bearing mount assembly without a mounting adaptor which employs two bolts and two nuts to secure the housing sections together (the bearing insert is not shown).

Referring now to FIGS. 15A and 15B, shown therein are views of an alternative example embodiment of a bearing mount apparatus 800 in which the housing sections 812 and 814 have two tapered end portions 817a, 817b, 819a, 819b that are securable to one another by a fastener, for example, a bolt 858b and a nut 858n. Otherwise, the bearing mount apparatus 800 is similar to the bearing mount assembly 100 and includes ribs such as ribs 834a, 835a, 836a and 837a to provide a mounting adaptor groove, a bearing groove 845a (for the bearing 802) and a sealing groove. The elements of the bearing mount apparatus 800 that are similar to those in the bearing mount apparatus 100 have like reference numerals, incremented by 700. For example, the bearing mount apparatus 800 includes ribs such as ribs 834a, 835a, 836a and 837a to provide a mounting adaptor groove, a bearing groove 845a for the bearing 802) and a sealing groove. However, to avoid repetition, the similar elements are not further discussed. The teachings disclosed herein with relation to the bearing mount apparatuses 100, 200, 300, 400, 500, 600, 700 or any other bearing mount apparatus disclosed herein, can generally apply to the bearing mount apparatus 800 as well. Also, this technique of using tapered housing sections with two bores securing the housing sections together can be used with the bearing mount apparatuses 100, 200, 300, 400, 500 and 600 instead of using four fasteners 158, 258, 358, 458, 558 and 658 and four corresponding bores 149, 249, 349, 449, 549 and 649.

Referring now to FIGS. 16A-16D, shown therein are views of another example embodiment of a bearing mount apparatus 900 showing two housing sections 912 and 914 of a split bearing housing that are securable to one another using a tapered threaded collar 901. The housing sections 912 and 914 have grooves 912g and 914g, respectively, on their outer surface that are sized to receive and engage threads 901t of the tapered threaded collar 901. Once a first portion of a mounting adaptor and a bearing insert are inserted into one of the housing sections 912 and 914, the other portions of the mounting adaptor and bearing insert are inserted into the other housing section and the tapered threaded collar 901 is then releasably screwed onto both housing sections 912 and 914. Otherwise, the bearing mount apparatus 900 is similar to the bearing mount assembly 100. The elements of the bearing mount apparatus 900 that are similar to those in the bearing mount apparatus 100 have like reference numerals, incremented by 800. For example, the bearing mount apparatus 900 includes ribs such as ribs 934a, 935a, 936a and 937a to provide a mounting adaptor groove, a bearing groove 945a for the bearing) and a sealing groove. However, to avoid repetition, the similar elements are not discussed. The teachings disclosed herein with relation to the bearing mount apparatuses 100, 200, 300, 400, 500, 600, 700, 800 or any other bearing mount apparatus disclosed herein, can apply to the bearing mount apparatus 900 as well. Also, this technique of using a tapered threaded collar to secure the housing sections together can be used with the bearing mount apparatuses 100, 200, 300, 400, 500 and 600 instead of the fasteners 158, 258, 358, 458, 558 and 658 and corresponding bores 149, 249, 349, 449, 549 and 649.

Referring now to FIGS. 17A-17C, shown therein are views of another example embodiment of a bearing mount apparatus 1000 having two housing sections 1012 and 1014 of a split bearing housing that are secured to one another using an eccentric locking collar 1001 (which may also be called a locking sleeve). The bearing mount apparatus 1000 is similar to the bearing mount assembly 100. The elements of the bearing mount apparatus 1000 that are similar to those in the bearing mount apparatus 100 have like reference numerals, incremented by 900. For example, the bearing mount apparatus 1000 includes ribs such as ribs 1034a, 1035a, 1036a and 1037a to provide a mounting adaptor groove, a bearing groove 1045a for the bearing) and a sealing groove. However, to avoid repetition, the similar elements are not discussed. The teachings disclosed herein with relation to the bearing mount apparatuses 100, 200, 300, 400, 500, 600, 700, 800, 900 or any other bearing mount apparatus disclosed herein, can apply to the bearing mount apparatus 1000 as well. Also, this technique of using an eccentric locking collar to secure the housing sections together can be used with the bearing mount apparatuses 100, 200, 300, 400, 500 and 600 instead of the fasteners 158, 258, 358, 458, 558 and 658 and corresponding bores 149, 249, 349, 449, 549 and 649.

The housing sections 1012 and 1014 have an eccentric outer diameter and the eccentric locking collar 1001 has an eccentric inner diameter. In particular each housing section 1012 and 1014 has an outer layer that has a varying thickness which increases from a smaller thickness 1012n, 1014*n* to a larger thickness 1012*t*, 1014*t*. Accordingly, the outer diameter of the housing sections 1012 and 1014 increases from one longitudinal edge 1012*e*1, 1014*e*1 to a second longitudinal edge 1012*e*2, 1014*e*2. Likewise, the eccentric locking collar 1001 has an inner layer with a varying thickness which increases from a smaller thickness 1001*n* to a larger thickness 1001*t* and the inner diameter of the eccentric locking collar 1001 decreases in a similar manner along the inner circumference. The housing section 1014 and the eccentric locking collar 1001 have indicators 1014*i* and 1001*i* that indicate neutral positions for these elements.

Once a first portion of a mounting adaptor and a bearing insert are inserted into one of the housing sections 1012 and 1014, the other portions of the mounting adaptor and bearing insert are inserted into the other housing section and the housing sections 1012 and 1014 are then slidably received by the eccentric locking collar 1001 in the "neutral" position so that the indicator 1014*i* is aligned with the indicator 1001*i*. In the neutral position, the thicker portions 1012*t*, 1014*t* of the eccentric outer diameter of the housing sections 1012 and 1014 are aligned with the thinner portions 1001*n* of the inner diameter of the eccentric locking collar 1001. Then by use of an appropriate tool the eccentric locking collar 1001 is turned clockwise or counter clockwise until the interference of the off center or eccentric inner diameter of the eccentric locking collar 1001 and outer diameter of the housing 1010 prevents the eccentric locking collar 1001 from rotating any further. At this point the housing 1010 is secured in position. The "pilot" diameter located at the edge of the housing 1010 is slightly smaller than the mating inner pilot diameter on the eccentric locking collar 1001 which maintains a center position for the eccentric locking collar 1001, thus preventing the eccentric locking collar 1001 from following the eccentric outer diameter on the housing 1010 which then provides the interference (or force) on the surface of the housing 1010 which secures the bearing mount assembly 1000 together.

It should be noted that the eccentric locking collar 1001 has an outer surface/outer layer with a plurality of straight edges (i.e. flattened sections). The outer surface of the eccentric locking collar 1001 can also be referred to as a nut that can be rotated by the tool. It should be noted that this outer portion of the eccentric locking collar 1001 can have other structural features such as notches or holes that receive a specific tool which is then used to tighten and/or loosen the eccentric locking collar 1001 around the bearing mount housing 1010.

Figure 4:
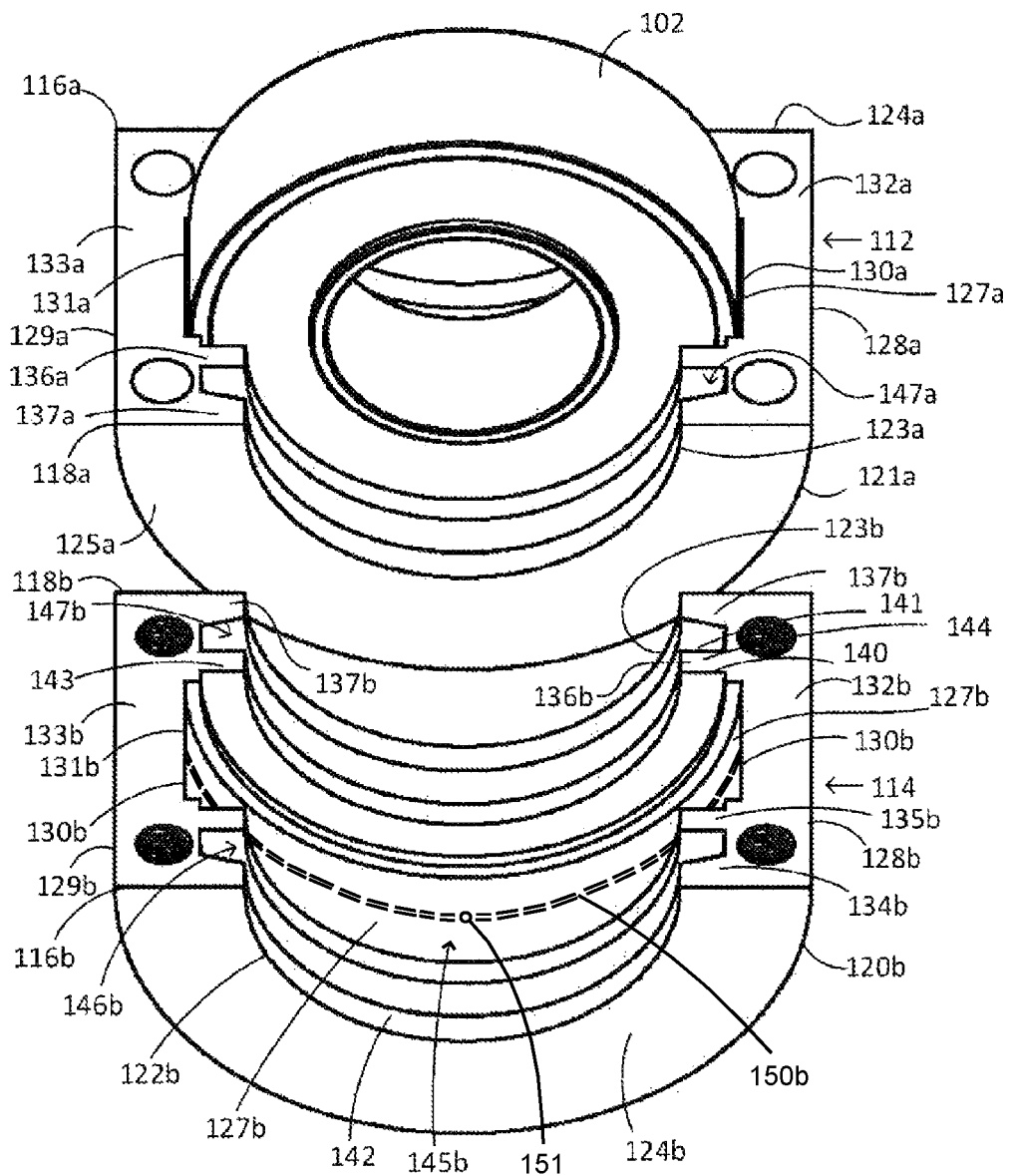
FIG. 4 is a perspective view of the bearing mount assembly of FIG. 1 in a split configuration without the mounting adapter, the ball bearing partially received in the first housing section.

It should be noted that the various embodiments of the bearing mount apparatuses described herein can receive additional lubrication. For example, as generally shown in FIG. 4, the housing sections for each of the bearing mount apparatuses described herein include lubrication grooves 151*a*, 151*b* on the interior surface of a bearing groove 145*a*, 145*b*, for example, and there is also a through porting 151 (e.g. external port) in the housing section to meet the lubrication groove. While each housing section includes a lubrication groove 150*a*, 150*b* that circumvents the outside of the bearing elements' outer race, only one section of the bearing housing includes the external through port for coupling to the lubrication grooves. For example, as shown in FIG. 4, the second housing section 114 includes the through porting 151. The external aperture of the through port is sized to receive the working end of a lubrication source such as a grease nipple, for example. The axial location of the lubrication groove is determined by the type of bearing element that is used with the bearing mount assembly.

In various embodiments, the bearing housing, e.g., housing 110, 210, 310, 410, 510, 610, 710, 810, 910, 1010 or any other housing disclosed herein, and the mounting adaptor, e.g., mounting adaptor 160, 260, 360 or any other mounting adaptor disclosed herein, can be modified to suit various applications, such as use in the food, mining, or agriculture industries, at least in part based on the condition, environment and requirement of each application, such as, but not limited to, the load the bearing within the housing should bear, the operating temperature, vibrational conditions, other environmental conditions such as the presence of certain chemicals, speed of rotation of the shaft, and the like. To accommodate the operating conditions, the housing and the mounting adaptor can be of various sizes, thicknesses, stiffness, strengths, and rigidity and materials of different types and gauges can be used in making the housing and the mounting adaptor. For example, the thickness of the walls of the housing sections of any of the embodiments described herein may require adjustment in dimensions. Alternatively, or in addition thereto, as another example, in some embodiments, the housing and the mounting adaptor can be made of stainless steel, cast iron, cast steel, cast sterling, or polymeric materials. For example, polymeric material can be used to avoid rust and lower the manufacturing cost when the housing is intended to be used for smaller bearings and smaller loadings.

It should be noted that there can be alternative embodiments for any of the bearing mounts shown herein in which the bearing groove may be centered in the bearing housing or located off center.

Figure 19:
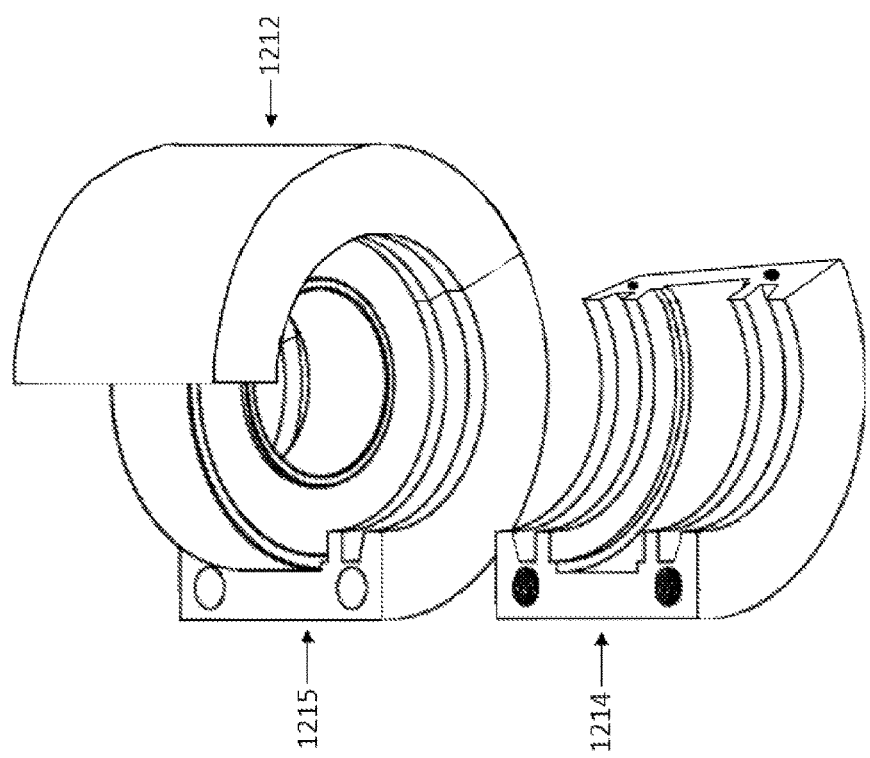
FIG. 19 is a perspective view of another example embodiment of the bearing mount assembly of FIG. 1 in a split configuration without the mounting adapter, the ball bearing partially received in the first housing section, with three housing sections that span the entire circumference of the bearing mount apparatus and each housing section sized to be a third of the bearing housing size.
Figure 18:
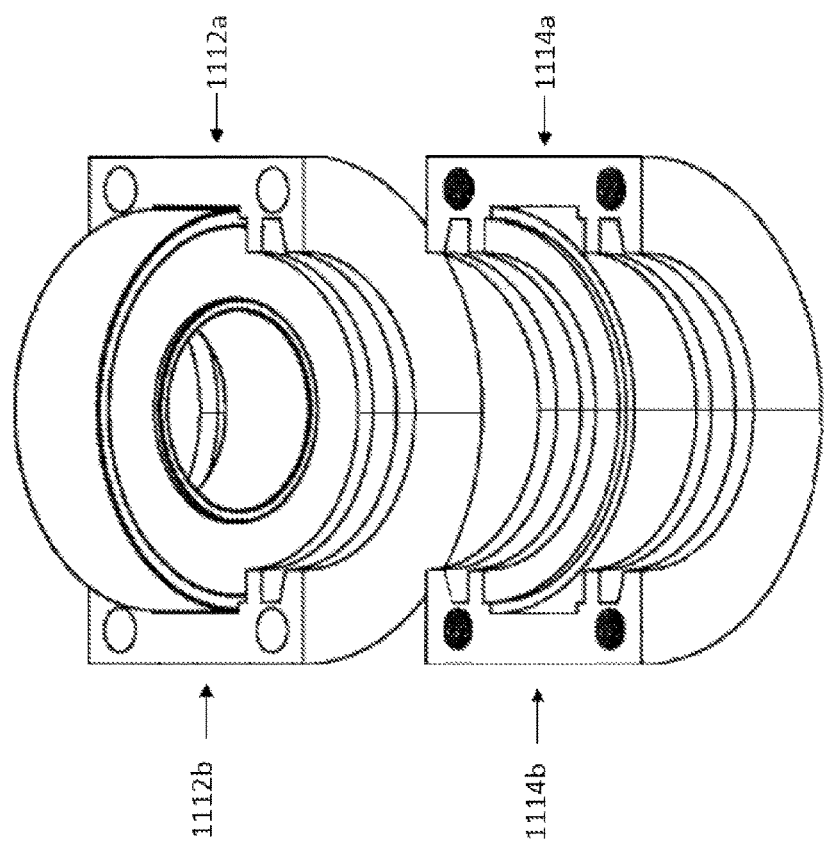
FIG. 18 is a perspective view of another example embodiment of the bearing mount assembly of FIG. 1 in a split configuration without the mounting adapter, the ball bearing partially received in the first housing section, with both the first and second housing section made from two housing subsections.

It should also be noted that there can be alternative embodiments for any of the bearing mount apparatuses shown herein where at least one of the two housing sections is made up of two or more subsections. For example, the housing sections of the example embodiments of the bearing mount apparatuses shown herein can be modified, such as such that a first housing section is a single piece while the second housing section is made up of two, three, four or more housing subsections. This may also involve creating equal sized housing subsections to form the second housing section. For example, when there are two housing subsections they each form half of the second housing section, when there are three housing subsections they each form a third of the second housing section and so on. Alternatively, both of the first and second housing sections may be made from two or more housing subsections. Referring now to FIG. 18, shown therein is an example embodiment of a bearing mount apparatus, which is similar to the bearing mount apparatus of FIG. 1, except that the first housing section and the second housing section are each divided into two subsections 1112*a*, 1112*b*, 1114*a*, 1114*b*. The elements of the bearing mount apparatus 1100 that are similar to those in the bearing mount apparatus 100 have like reference numerals, incremented by 1000. Alternatively, there can be embodiments of the bearing mount apparatuses shown herein in which there are three housing sections that span the entire circumference of the bearing mount apparatus and each housing section is sized to be a third of the bearing housing size. Referring now to FIG. 19, shown therein is an example embodiment of a bearing mount apparatus, which is similar to the bearing mount apparatus of FIG. 1, except that the split bearing housing is divided into three housing subsections 1212, 1214, 1215. The elements of the bearing mount apparatus 1200 that are similar to those in the bearing mount apparatus 100 have like reference numerals, incremented by 1100.

It should also be noted that while the term sealing cap has been used herein, in alternative embodiments, the sealing cap may be provided by one of many manufactured seals that are available and suitable for the particular embodiment of the bearing mount assembly such as, but not limited to, a lip seal, a labyrinth seal and a mechanical contact seal, for example.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A bearing mount apparatus for housing and retaining a bearing in a fixed location relative to a structure, the bearing mount apparatus comprising:
    a split bearing housing comprising a first housing section and a second housing section removably couplable to the first housing section, the bearing being removably received within the split bearing housing when the second housing section is coupled to the first housing section; and
    a mounting adaptor comprising a main body intermediate a first adaptor end and a second adaptor end, the first adaptor end being configured to couple the mounting adaptor to the structure and the second adaptor end being removably received within the split bearing housing for coupling the mounting adaptor to the split bearing housing and retaining the bearing in the fixed location relative to the structure when the second housing section is coupled to the first housing section;
wherein the second adaptor end comprises a housing flange, the housing flange having a first flange face tapered to the main body and a second flange face opposite the first flange face being substantially perpendicular to the main body.

2. The bearing mount apparatus of claim 1, wherein each of the first and the second housing sections comprises a first housing section end and a second housing section end spaced longitudinally away from the first housing section end.

3. The bearing mount apparatus of claim 2, wherein each of the first and the second housing sections have first inner wall portions that are structured to removably receive a portion of the bearing in a position longitudinally intermediate the first housing section end and the second housing section end.

4. The bearing mount apparatus of claim 3, wherein each of the first and the second housing sections have second inner wall portions that are structured to removably receive a portion of the second adaptor end in a position disposed towards the first housing section end.

5. The bearing mount apparatus of claim 3, wherein the first and the second housing sections comprise inner walls having a plurality of longitudinally spaced apart ribs and a plurality of grooves where at least one groove is defined between two successive ribs of the plurality of ribs.

6. The bearing mount apparatus of claim 5, wherein the plurality of grooves comprises a bearing groove that is configured to receive a portion of the bearing, and a mounting adaptor groove that is configured to receive a portion of the second adaptor end.

7. The bearing mount apparatus of claim 6, wherein the mounting adaptor groove is defined in a first space bounded by a first rib positioned towards the first housing section end, the inner wall of the split bearing housing and by a second rib that is positioned intermediate the first housing section end and the second housing section end.

8. The bearing mount apparatus of claim 7, wherein the bearing groove is defined in a second space bounded by the second rib, the inner wall of the split bearing housing and a third rib that is positioned longitudinally away from both the first housing section end and the second rib.

9. The bearing mount apparatus of claim 8, wherein
    the housing flange has a flange thickness and a flange diameter and
    for each of the first and the second housing sections:
        a width of the mounting adaptor groove is equal to or greater than the flange thickness;
        a radius of the mounting adaptor groove is equal to or greater than one half of the flange diameter; and
        the bearing groove is configured to receive the bearing through an interference fit.

10. The bearing mount apparatus of claim 8, wherein outer walls of the first and the second housing sections are curved about a longitudinal axis and define a semicircle on a plane generally orthogonal to the longitudinal axis intersecting the outer wall, each of the first and second housing sections have a hollowed semi-cylinder shape, and when the second housing section is coupled to the first housing section the split bearing housing has a hollowed cylinder shape.

11. The bearing mount apparatus of claim 10, wherein for each of the first and the second housing sections:
    the second housing section end is at least partially open; and
    the plurality of ribs further comprises a fourth rib being positioned longitudinally away from the first rib, the second rib and the third rib towards the second housing section end;
wherein, when the second housing section is coupled to the first housing section, the at least partially open second housing section end has a generally circular opening.

12. The bearing mount apparatus of claim 11, wherein a semi-annular sealing groove is defined by the third rib, the inner wall of the respective housing section and the fourth rib, the semi-annular sealing groove being configured to removably receive a portion of a sealing cap for sealing the second housing section end.

13. The bearing mount apparatus of claim 5, wherein the plurality of ribs are arcuate and project radially inwardly.

14. The bearing mount apparatus of claim 13, wherein the plurality of grooves are arcuate.

15. The bearing mount apparatus of claim 14, wherein the plurality of ribs and the plurality of grooves are semi-annular.

16. The bearing mount apparatus of claim 1, wherein, for each of the first and the second housing sections, the second housing section end is closed.

17. The bearing mount apparatus of claim 1, wherein the first and the second housing sections are identical.

18. The bearing mount apparatus of claim 1, wherein each of the first and the second housing sections comprise at least one inner perimeter that at least partially defines and bounds at least one bore that is configured to receive at least one fastener for removably coupling the second housing section to the first housing section.

19. The bearing mount apparatus of claim 1, further comprising a clamp band having a ring, coupling members and a fastener, the ring of the clamp band being disposed along outer surfaces of the first and second housing sections and the coupling members being coupled to one another by the fastener to secure the first and second housing sections together.

20. The bearing mount apparatus of claim 19, wherein the first and second housing sections comprise grooves on the outer surfaces thereof that are sized to receive the ring.

21. The bearing mount apparatus of claim 1, wherein the first and the second housing sections comprise tapered end portions with at least one inner perimeter that at least partially defines and bounds at least one bore that is configured to receive at least one fastener for removably coupling the second housing section to the first housing section.

22. The bearing mount apparatus of claim 1, further comprising a tapered threaded collar with threads on an internal surface thereof, the first and second housing sections comprise corresponding grooves on an outer surface thereof, the tapered threaded collar is sized to removably receive the first and second housing sections and the tapered threaded collar is screwed onto the first and second housing sections to secure the first and second housing sections together.

23. The bearing mount apparatus of claim 1, further comprising an eccentric locking collar with an eccentric internal diameter, the first and second housing sections comprise an outer layer with a varying thickness to provide the housing with an eccentric outer diameter, and the eccentric locking collar is sized to removably receive the first and second housing sections and be rotated relative to the first and second housing sections to secure the first and second housing sections together.

24. The bearing mount apparatus of claim 1, further comprising the bearing, the bearing being a spherical ball bearing, a cylindrical ball bearing, a thrust bearing, a linear bearing, a tapered roller bearing, or a plain bearing.

25. The bearing mount apparatus of claim 1, wherein the first adaptor end comprises a mounting flange.

26. The bearing mount apparatus of claim 25, wherein each of the first adaptor end and the second adaptor end is at least partially open, the mounting flange being coupled to the structure towards the first adaptor end, the housing flange being coupled to the main body towards the second adaptor end, the main body having an inner perimeter defining an aperture in fluid communication with the at least partially open first and second adaptor ends, the aperture being configured to allow a shaft to pass through the mounting adaptor.

27. The bearing mount apparatus of claim 25, wherein the mounting flange is a weldment adaptor to be welded to the structure.

28. The bearing mount apparatus of claim 25, wherein the mounting flange is configured to be removably coupled to the structure using a plurality of fasteners.

29. The bearing mount apparatus of claim 28, wherein the mounting flange comprises a plurality of inner perimeters at least partially defining and bounding a plurality of bores that are configured to receive the plurality of fasteners to removably couple the mounting flange to the structure.

30. The bearing mount apparatus of claim 1, wherein at least one of the first and second housing sections comprise two or more subsections.

31. The bearing mount apparatus of claim 1, wherein the split bearing housing comprises a third housing section that is removably couplable to the first and second housing sections, and the bearing and second adaptor end of the mounting adaptor is removably received within the split bearing housing when the first, second and third housing sections are coupled to one another.

32. The bearing mount apparatus of claim 1, further comprising a lubrication groove adjacent the bearing and a through porting that connects the lubrication groove to an exterior surface of the split bearing housing for receiving lubrication.

33. A bearing mount apparatus for housing and retaining a bearing in a fixed location relative to a structure, the bearing mount apparatus comprising:
   a split bearing housing comprising a first housing section and a second housing section removably couplable to the first housing section, the bearing being removably received within the split bearing housing when the second housing section is coupled to the first housing section; and
   a mounting adaptor comprising a first adaptor end and a second adaptor end, the first adaptor end being configured to couple the mounting adaptor to the structure and the second adaptor end being removably received within the split bearing housing for coupling the mounting adaptor to the split bearing housing and retaining the bearing in the fixed location relative to the structure when the second housing section is coupled to the first housing section;
   wherein the first adaptor end comprises a mounting flange configured to be removably coupled to the structure, the mounting flange having a plurality of inner perimeters at least partially defining and bounding a plurality of bores that are configured to receive fasteners to removably couple the mounting flange to the structure.

34. A bearing mount apparatus for housing and retaining a bearing in a fixed location relative to a structure, the bearing mount apparatus comprising:
   a split bearing housing comprising a first housing section and a second housing section removably couplable to the first housing section, the bearing being removably received within the split bearing housing when the second housing section is coupled to the first housing section; and
   a mounting adaptor comprising a first adaptor end and a second adaptor end, the first adaptor end being configured to couple the mounting adaptor to the structure and the second adaptor end being removably received within the split bearing housing for coupling the mounting adaptor to the split bearing housing and retaining the bearing in the fixed location relative to the structure when the second housing section is coupled to the first housing section;
   wherein each of the first and the second housing sections comprises:
   a first housing section end and a second housing section end spaced longitudinally away from the first housing section end, and an inner wall that is structured to removably receive a portion of the bearing in a position longitudinally intermediate the first housing section end and the second housing section end, the inner wall comprises a plurality of longitudinally spaced apart ribs and a plurality of grooves where at least one groove is defined between two successive ribs of the plurality of ribs.

35. The bearing mount apparatus of claim 34, wherein the plurality of grooves comprises a bearing groove that is configured to receive the portion of the bearing, a mounting adaptor groove that is configured to receive a portion of the second adaptor end, and a semi-annular sealing groove that is configured to removably receive a portion of a sealing cap for sealing the second housing section end;

wherein the mounting adaptor groove is defined in a first space bounded by a first rib positioned towards the first housing section end, the inner wall of the split bearing housing and by a second rib that is positioned intermediate the first housing section end and the second housing section end;

wherein the bearing groove is defined in a second space bounded by the second rib, the inner wall of the split bearing housing and a third rib that is positioned longitudinally away from both the first housing section end and the second rib;

wherein the semi-annular sealing groove is defined by the third rib, the inner wall of the respective housing section and a fourth rib that is positioned longitudinally away from the first rib, the second rib and the third rib towards the second housing section end; and wherein outer walls of the first and the second housing sections are curved about a longitudinal axis and define a semicircle on a plane generally orthogonal to the longitudinal axis intersecting the outer wall, each of the first and second housing sections have a hollowed semi-cylinder shape, the second housing section end is at least partially open for each of the first and the second housing sections, and when the second housing section is coupled to the first housing section, the split bearing housing has a hollowed cylinder shape, and the at least partially open second housing section end has a generally circular opening.

\* \* \* \* \*